United States Patent
Hack

(10) Patent No.: US 12,255,441 B1
(45) Date of Patent: Mar. 18, 2025

(54) MECHANISM FOR RACKING IN AND ENSURING AGAINST OVER RACKING IN AND STILL ALLOWING RACKING OUT OF CIRCUIT BREAKER WITH RESPECT TO ENCLOSURE

(71) Applicant: National Breaker Services LLC, Middlebury, CT (US)

(72) Inventor: Bruce Hack, Yonkers, NY (US)

(73) Assignee: National Breaker Services, LLC, Middlebury, CT (US)

( * ) Notice: Subject to any disclaimer, the term of this patent is extended or adjusted under 35 U.S.C. 154(b) by 263 days.

(21) Appl. No.: 17/986,495

(22) Filed: Nov. 14, 2022

(51) Int. Cl.
*F16H 25/20* (2006.01)
*H02B 1/36* (2006.01)

(52) U.S. Cl.
CPC .............. *H02B 1/36* (2013.01); *F16H 25/20* (2013.01)

(58) Field of Classification Search
CPC ........ H02B 11/10; H02B 1/042; H02B 1/044; H02B 11/167
USPC .................................................. 361/605, 606
See application file for complete search history.

(56) References Cited

U.S. PATENT DOCUMENTS

| | | | | |
|---|---|---|---|---|
| 1,869,856 A * | 8/1932 | MacNeil | ................ | H02B 11/00 361/607 |
| 1,953,822 A * | 4/1934 | Reed | .................... | H02B 11/173 361/615 |
| 2,673,260 A * | 3/1954 | Lester | .................. | H02B 11/133 292/241 |
| 2,858,389 A * | 10/1958 | Cuorato | ................. | H02B 11/04 200/50.26 |
| 3,437,768 A * | 4/1969 | Miller | .................. | H01H 9/0066 200/50.23 |
| 3,783,209 A * | 1/1974 | Cleaveland | .......... | H02B 11/133 200/50.25 |
| 4,236,189 A * | 11/1980 | Yosida | ................... | H02B 11/10 361/615 |
| 5,477,017 A * | 12/1995 | Swindler | .............. | H02B 11/127 361/605 |
| 7,022,923 B2 * | 4/2006 | Liebetruth | ........... | H02B 11/133 200/50.21 |
| 8,390,975 B1 * | 3/2013 | Ledbetter | ................. | H02B 3/00 361/115 |
| 8,497,439 B2 * | 7/2013 | Pai | ......................... | H01H 71/08 361/636 |
| 8,648,271 B2 * | 2/2014 | Kim | ..................... | H02B 11/127 200/50.26 |
| 9,972,458 B2 * | 5/2018 | Lee | ........................ | H02B 11/10 |
| 11,444,439 B1 * | 9/2022 | Hack | .................... | H02B 11/127 |

(Continued)

*Primary Examiner* — Anatoly Vortman
(74) *Attorney, Agent, or Firm* — Andrew S. Langsam

(57) ABSTRACT

A mechanism for a circuit breaker to rack in and out of a cabinet enclosure has a long, threaded screw rod on the circuit breaker captured into a stationary nut at the back of the cabinet. Racking inwardly is limited by the selective release of the nut when the maximum extent of racking in is reached. When a cross beam of the circuit breaker reaches its predetermined limit, further racking in is prevented as, at that point, the nut is no longer held in place. Racking out of the circuit breaker from the cabinet is still allowed, if desired. Non-rotative square rods and rotative round rods, along with paddles of the rotative round rods interact with protrusions on the outside of the nut to ensure racking in, racking out, preventing cross threading and limiting the racking in, all as desired.

15 Claims, 10 Drawing Sheets

(56) References Cited

U.S. PATENT DOCUMENTS

| | | | |
|---|---|---|---|
| 12,085,614 B1* | 9/2024 | Hack | G01R 15/181 |
| 2004/0020753 A1* | 2/2004 | Liebetruth | H02B 11/133 |
| | | | 200/50.21 |
| 2010/0236904 A1* | 9/2010 | Capelli | H02B 11/28 |
| | | | 200/50.23 |
| 2010/0236905 A1* | 9/2010 | Capelli | H02B 11/127 |
| | | | 200/50.24 |
| 2012/0199450 A1* | 8/2012 | Bower | H02B 11/127 |
| | | | 200/50.25 |
| 2014/0260731 A1* | 9/2014 | Devanand | F16H 25/20 |
| | | | 74/89.23 |
| 2016/0156164 A1* | 6/2016 | Yang | H01H 33/46 |
| | | | 200/50.24 |
| 2016/0372899 A1* | 12/2016 | Gan | H02B 11/127 |
| 2017/0237241 A1* | 8/2017 | Benke | G06F 1/16 |
| | | | 200/50.23 |
| 2017/0264084 A1* | 9/2017 | Mecca | H01H 71/025 |

* cited by examiner

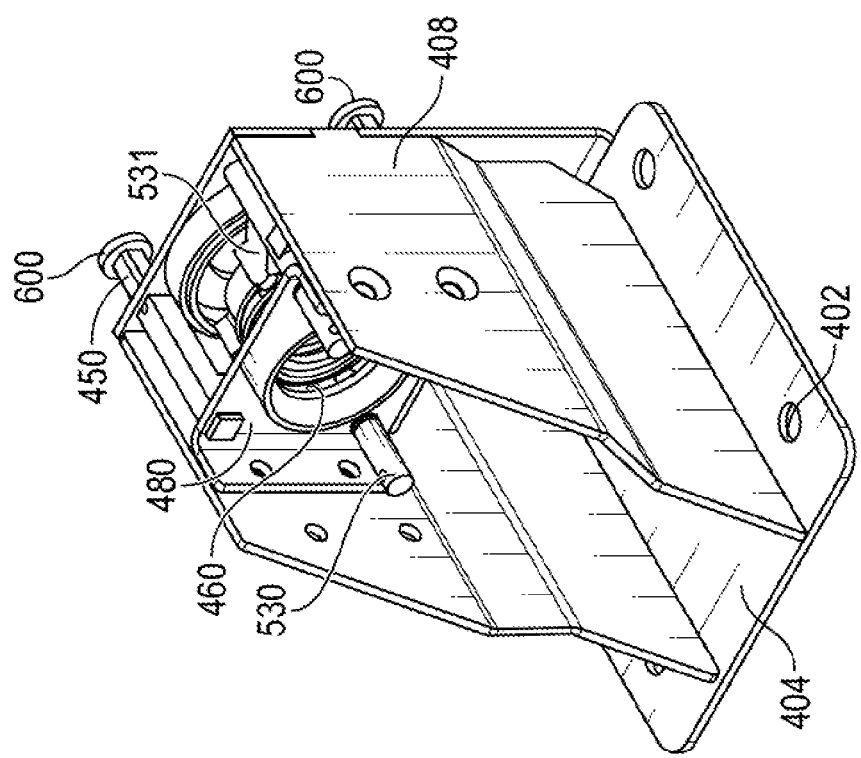
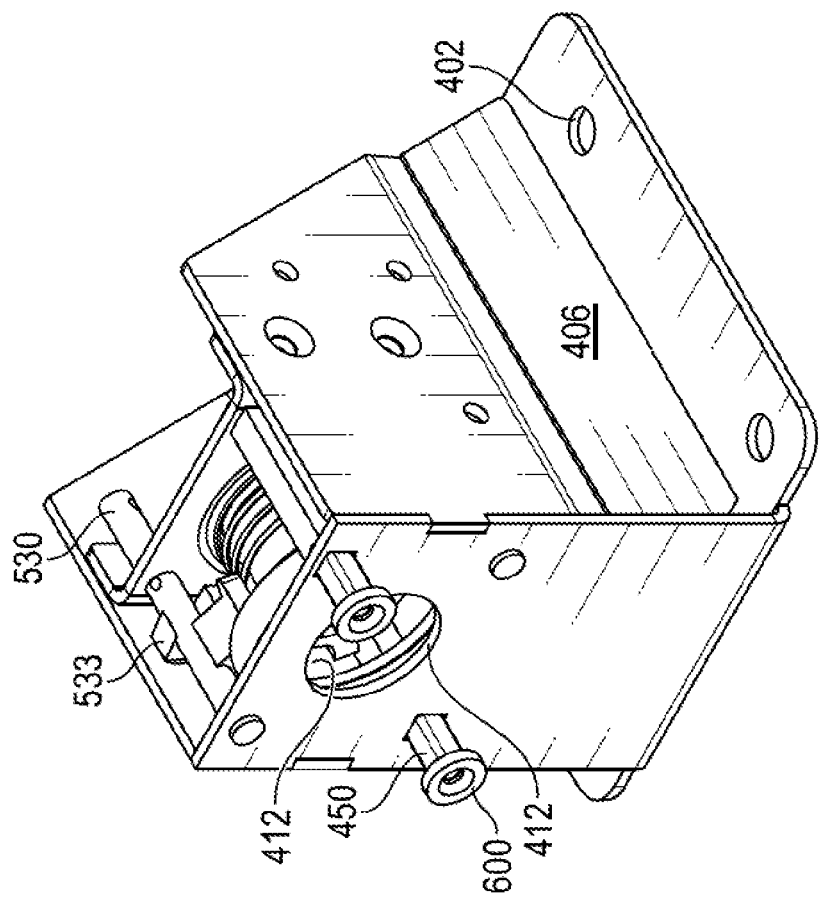
FIG. 7

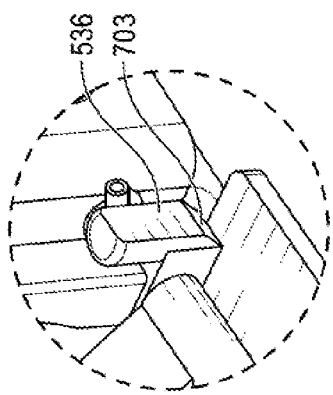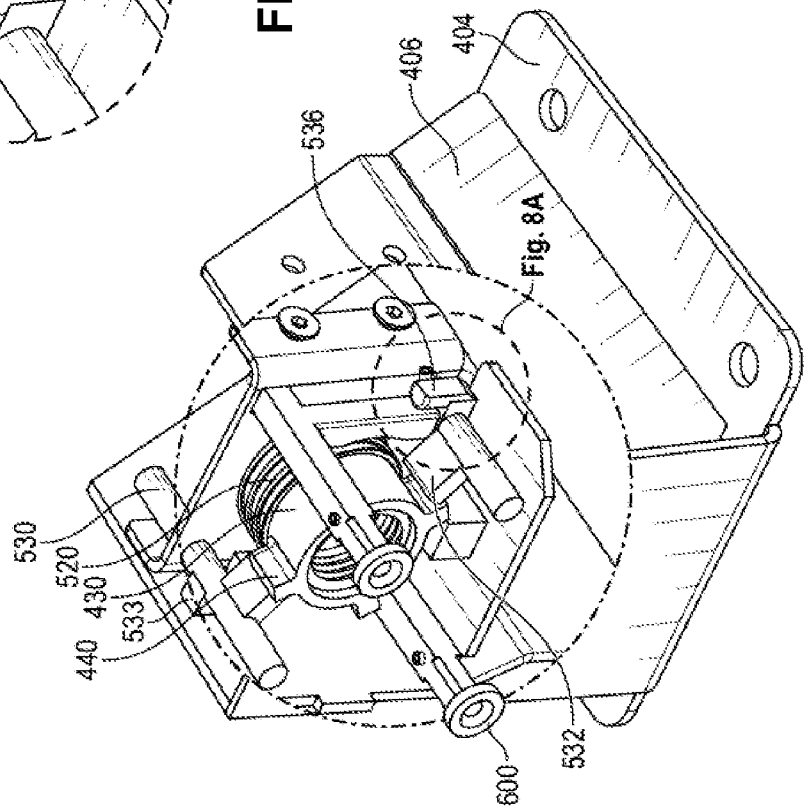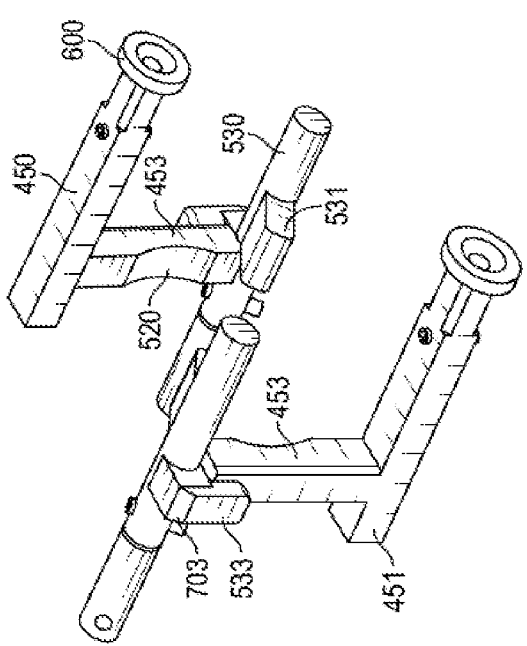

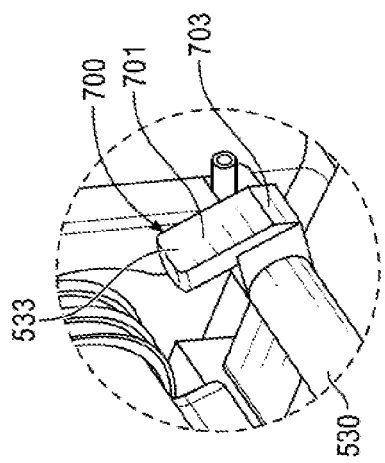
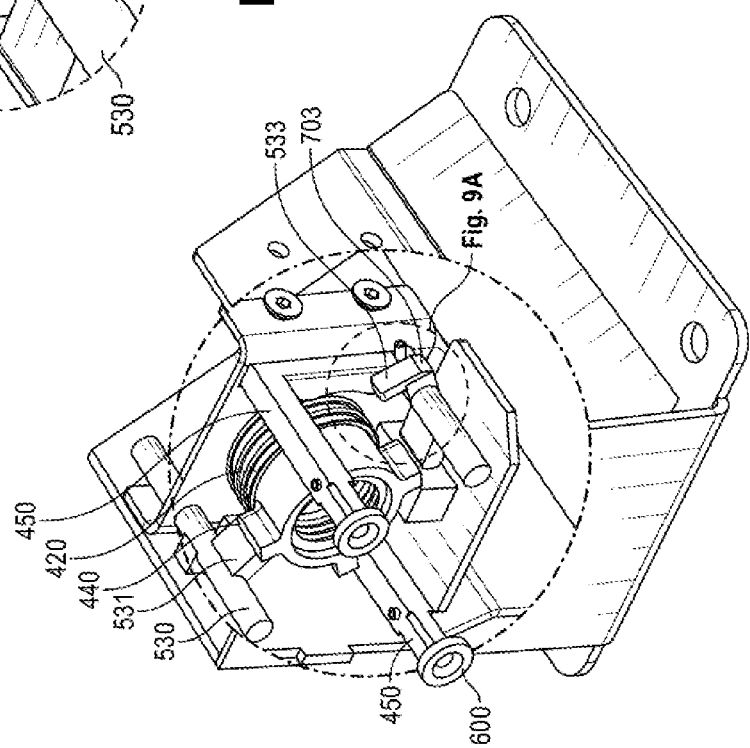
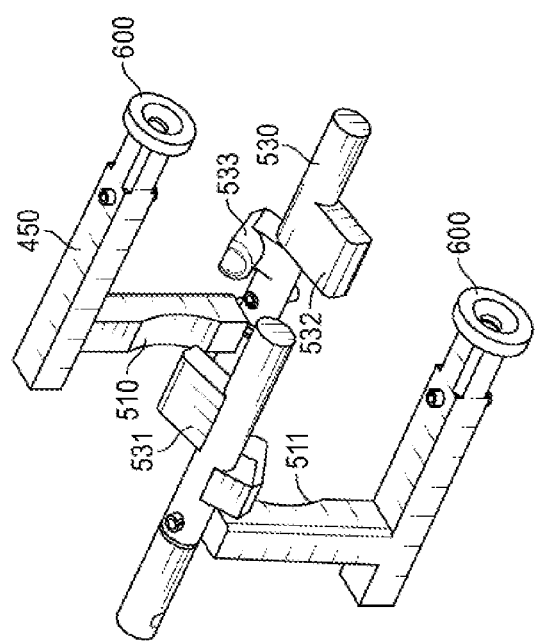
FIG. 9A
FIG. 9
FIG. 9B

MECHANISM FOR RACKING IN AND ENSURING AGAINST OVER RACKING IN AND STILL ALLOWING RACKING OUT OF CIRCUIT BREAKER WITH RESPECT TO ENCLOSURE

BACKGROUND OF THE INVENTION

The present invention relates to a device for racking in and out an electrical device, a circuit breaker for a large factory or electric Utility substation into its switchgear enclosure, cubicle or case, for example, and relates to an electrical-mechanical mechanism to be carefully secured within a switchgear enclosure, cubicle, housing, case, or cabinet (hereinafter collectively often referred to as the "enclosure" or "case") in use as an industrial-type electrical substation or circuit breaker. Typically these roll in and out of the enclosure on wheels for repair and maintenance of the circuit breaker. The present invention is a marked improvement over the mechanism shown and described in U.S. Pat. No. 11,444,439, issued on Sep. 13, 2022 (hereinafter the "'439 Patent") and identifying the same inventor and assignee as that of the present invention. The teachings, written description, and drawings of that U.S. Pat. No. 11,444,439 are expressly incorporated herein.

A mechanism described and claimed in the '439 Patent relates to a bracket held on the floor and at the rear of the enclosure, holding a forwardly spring-biased, internally threaded nut, which accepts a large, threaded longitudinal rod, extending from front to rear of the circuit breaker, itself with meshing external screw threads to the threads of the nut. Those threads of the long screw rod mesh and cooperate with the internal threads of the nut of the rear bracket. The clockwise driving of the screw rod, held beneath the circuit breaker, pulls the circuit breaker into the stationary nut and draws the circuit breaker into the enclosure. As explained therein, when the technician needs access to the rear of the circuit breaker, he must first eliminate the power to the device and then remove the circuit breaker from the enclosure. This can be done, according to the '439 Patent, by manually turning or using a power drill, counterclockwise, on the head end of the large threaded rod-like screw so as to rack out the circuit breaker. In effect, this rotational turning of the screw rod results in longitudinal movement of the circuit breaker with respect to the enclosure—the racking out of the device from its case. It should be appreciated that unscrewing the threaded screw rod secured to the bottom of the circuit breaker from the stationary nut at the rear and bottom of the enclosure will cause the circuit breaker (upon which the screw is rotatively secured or held) to longitudinally pull (along the axis of the rod) the circuit breaker out of the enclosure. Then after repairs are made or maintenance provided, when the circuit breaker is desirably meant to be resecured into its enclosure or case, the circuit breaker is pushed into the case (such that the wheels glide and are tracked upon parallel rails or tracks on the floor of the case) and, then, the same front to back extending threaded screw rod is turned, this time, clockwise, manually or by the power drill connected to the outwardly extending front end of the screw rod, so as to turn the screw rod, while first pushing slightly on the front of the circuit breaker until the leading thread of the screw rod engages the internal threads of the stationary nut at the bottom and rear of the enclosure, and further turning of the screw threads of the screw rod will cause the circuit breaker, on its wheels, to be longitudinally pulled into the enclosure and thus move the circuit breaker inwardly into the enclosure. It is clear that rotation of the threaded screw or long rod with respect to the non-rotatively held nut will cause the circuit breaker to rack in or out of the case, depending upon the direction of rotation of the threaded rod or screw. In effect, the rotational motion of the screw rod with threads held by the nut is translated into longitudinal motion of the circuit breaker into and out of the enclosure. This is known as racking in or racking out of the circuit breaker with respect to the enclosure.

The present invention is an improvement over the prior art device shown in the identified US Patent. An invention of the '439 Patent relates to the threaded screw rod mechanism and providing a portion of the rotative, externally threaded screw rod with no threads at a segment behind its leading tip and a length of threads. Rather, a segment of the rotative screw rod, behind a length of threads (extending towards the front of the enclosure) is not threaded, so that the operator cannot over rack the circuit breaker into the enclosure. If that were accidentally "allowed" to happen, without the invention of the '439 Patent, damage and injury could result. Thus that invention (absence of screw threads on a segment of the rod, so that when it reaches a position within the capturing screw nut) a mechanism is provided for preventing the over racking in of the circuit breaker with respect to the enclosure. In other words, best understood by a reading of the '439 Patent, the non-threaded portion of the rotating screw rod will be, after sufficient racking in has been accomplished, within the internal screw-threaded portion of the nut and further turning of the screw rod with respect to the stationary held nut will not further cause the circuit breaker to longitudinally move inwardly or be racked into the case. This prevents damage, down time, and possible injury. When the threaded portion of the racking screw rod has exited the rear of the stationary nut, no further longitudinal motion ensues. The non-threaded portion of the screw rod, at some point longitudinally driven to the point of being within the threaded portion of the nut, freely turns without any further advancement of the circuit breaker into the enclosure. This prevents over-racking in. Yet, when the circuit breaker is sought to be removed from the case, manually or by drill, and rotating the threaded screw rod in a counterclockwise manner, the mechanism disclosed therein still allows the circuit breaker to be removed from the enclosure as then desired, i.e., it will become racked out for repair and/or maintenance.

The present invention relates to the same field of art and specifically to providing an over-racking in limit mechanism. It relates to the mechanism which is taught by the '439 Patent. The '439 invention prevents over racking in and permits racking out, as desired, of a circuit breaker from its case or enclosure. The present invention does so, as well, but is a significant and important improvement. It has been seen in practice of operation of the device of the '439 Patent that removing the circuit breaker from the enclosure and attempted reinstallation (racking in) can result in problems. Racking out using the mechanism of the '439 Patent, after the circuit breaker has reached its racking in limit (when no threads of the screw rod are in contact with the screw threads of the nut) can be problematic and more so than racking in issues. As can be appreciated by understanding the device shown and described in the '439 Patent, which does ensure against over racking in of the circuit breaker into the enclosure, removal or another racking out can be highly problematic. More specifically, reengaging of the threads of the screw rod with the internal threads of the nut while seeking to rack out the circuit breaker with respect to the enclosure of the '439 patented device, can result in cross threading of the screw threads of the screw rod with respect to those of the nut. That can lead to damage, down time and costly repairs which is especially problematic with the circuit breaker fully within the switchgear cubicle. The initial re-meshing of the screw rod and its segment of threads with the stationary internal threads of the nut can become accidentally cross threaded and lead to difficult, expensive and safety issues. The present invention eliminates these problems.

The present invention relates to a new mechanism that cooperates with the longitudinal screw rod with external threads which mate with a stationary nut, similar to and related to that shown in '439 Patent, but ensures against cross threading of the threads of the screw rod when the circuit breaker is sought to be removed from the case. Rather, the present invention ensures that even when the racking in limit of the circuit breaker into the enclosure is reached, the threads of the screw rod maintain its threads with the internal threads of the nut. No disengagement of the threads of the screw rod from the threads of the nut occurs even though a limit mechanism is provided to prevent over racking in. And, yet, the new and present invention, of course, still prevents over-racking in of the circuit breaker and, when needed, allows for the entire removal of the circuit breaker from the enclosure. The present invention is a significant advance over the '439 patented technology.

DESCRIPTION OF THE PRIOR ART

As mentioned above, the present invention is a specific improvement to the mechanism shown, described and taught by U.S. Pat. No. 11,444,439 issued Sep. 13, 2022. The teachings of that reference and that identified prior-issued US Patent are expressly incorporated herein by reference. That Patent teaches a racking in and racking out mechanism for a circuit breaker with respect to an enclosure, switchgear cubicle or case which basically comprises a screw-like longitudinal rod with external threads extending from the front to the rear of the circuit breaker. Generally, the screw rod is rotatively held at the center (side to side) and bottom of the circuit breaker. The circuit breaker is large, in the order of about 2-5 feet wide, about 3-5 feet in height and about 4-6 feet in depth. It is of significant weight and is in need of protection. It needs to be held in a sturdy enclosure or case for safety and durability. The circuit breaker carries thousands of volts and amperes of electricity and is meant to be housed in a switchgear cubicle, enclosure, case or cabinet. Towards this end, the circuit breaker is supported by rotative wheels on its bottom which can rest on the floor of the case or cabinet or upon tracks.

The nature of circuit breakers is such that they are designed to close and open upon the occurrence of short circuits. These can be events of massive electrical power which can cause the circuit breaker to physically "jump" in any direction. Therefore, circuit breakers often have some sort of stabilizing tracks or channels for the wheels to prevent such forceful impulses from damaging equipment. When pushed inwardly (racking in) the circuit breaker into the enclosure, it rides on its wheels onto and over the rails and into the enclosure or case. When desirably pulled out (racking out) the circuit breaker can be removed, by mechanically pulling the front of the device, from the enclosure or case. One highly effective manner of pushing in (racking in) and pulling out (racking out) the circuit breaker with respect to the enclosure is the mechanical cooperation of an externally threaded, long screw rod with a rear-of-the-case secured, stationary and threaded nut located at the back and bottom of the enclosure. That nut has internal screw threads which mate with the external screw threads of the projecting screw rod into the enclosure. Thus, when the forwardly or proximal extending end (beyond the front panel) of the screw rod is turned clockwise, the distal end of the screw rod (with threads) can be pushed into the internal threads of the nut and further turning of the screw rod will result in longitudinally pulling of the circuit breaker into the enclosure. The screw threads of the rod pull the circuit breaker within the screw threads of the stationary nut held in a bracket at the bottom of the enclosure. This results in the circuit breaker being pulled or racked into the enclosure.

When that screw rod is turned counterclockwise, the external threads of the screw rod will still rotate within the threads of the stationary nut and the circuit breaker will be mechanically pulled out of the enclosure. Rotation of the screw rod counterclockwise and clockwise with respect to the stationary nut translates into forward and backward (with respect to the front of the enclosure) longitudinal movement of the circuit breaker, on the wheels, out of and into the enclosure.

Again, the invention of the '439 Patent relates to providing a proximal segment of the leading end of the screw rod (but behind the distal and forward threaded portion) with a section which is non-threaded so that when it reaches, during racking in, the internal threads of the nut, further clockwise rotation of the screw rod will not further pull the circuit breaker within the enclosure so that damage as a consequence of racking in too much is avoided. Clearly, when the screw rod is initially turned clockwise, its threads at the rear or back of the circuit breaker, will first thread with the stationary threads of the nut and further turning of the screw will pull the circuit breaker into the enclosure towards the rear of the enclosure thereby racking the circuit breaker into the enclosure. As described, shown and even claimed in the '439 US Patent, a device is shown therein for ensuring against over racking inwardly of the circuit breaker with respect to the enclosure. That mechanism comprises a rear segment of the screw rod being provided without external threads which when aligned and within the internal screw threads of the nut will not move the circuit breaker more rearwardly (distally) into the enclosure as there is no longer a pulling-in force to effect that longitudinal movement. Rather, the screw rod portion without the threads will simply free spin within the nut when the smooth (non-threaded) portion of the screw rod is aligned and within the internal threads of the nut.

However, it has been discovered in practice that workers/technicians, while fully understanding the simplicity of the design and its intended manner of operation, will, nevertheless, still continue to turn the screw rod and push on the circuit breaker to effect an almost over racking in of the circuit breaker. More importantly, when they start to rack out the circuit breaker with respect to the enclosure, these workers/technicians often try to start the process by forcing/overpulling the rod out with some brute force. This can cause cross threading of the screw rod with respect to the threads of the nut. This is clearly undesirable. And, since it can happen with the circuit breaker within the case, it is more problematic than cross threading during initial racking in. Stated a bit differently, the operators/technicians, when seeking to rack out the circuit breaker from the case can initially cross thread the proximal end of the external screw threads of the screw rod with respect to the distal end of the internal screw threads of the nut. This can be a major problem. It then becomes highly problematic to de-energize the circuit breaker and realign the screw rod's threads with those of the nut, to properly allow for turning of the screw rod to rack out the circuit breaker. That is a consequence and perceived problem of the earlier '439 Patent and design. It allows, as a consequence of a limit to racking in, for the complete disengagement of the external screw threads of the screw rod from the internal screw threads of the nut. Yet, when racking out is needed, that disengagement between external threads of screw rod and internal threads of the nut (the racking in limit mechanism) can result in cross threading.

The present invention provides a new, novel and creative manner of ensuring that the circuit breaker is able to be easily racked inwardly into the enclosure with no opportunity for over-racking in and no opportunity for cross threading of screw threads of screw rod with the threads of the nut. There is still provided an over racking-in limiting or prevention mechanism. But, the racking in limiting and/or prevention mechanism does not allow for unthreading of the threads of the screw rod from the internal threads of the nut. So when trying to subsequently rack out the circuit breaker from the enclosure, no cross threading can occur as the threads of the screw rod have been maintained (when racked in) within the threads of the nut, while still providing a mechanism for preventing over racking in. Thus the possibility of cross threading when racking out cannot occur. When racking out is desired, the possibility of cross threading is avoided due to elimination of the ability of the screw rod and its threads from becoming disengaged from the nut. The screw rod and nut are always threaded together-during racking in, when a racking in limit is reached and when the circuit breaker is initially sought to be racked out. Cross threading when racking out is avoided, along with its potential problems. And, yet, the present system provides a mechanism for limiting racking in while maintaining external screw threads of the screw rod within the internal threads of the nut.

Basically, when the maximum length or degree of racking in is obtained, the nut is no longer maintained stationary but, rather, the nut is allowed to freely spin upon and along with further rotation of the threaded screw rod so that no longitudinal movement of the circuit breaker with respect to the enclosure is allowed even if the screw rod is further rotated. If the threaded nut on the screw rod rotates with even further rotation of the screw rod, there will be no longitudinal movement of the circuit breaker into or out of the enclosure. A racking in limit is provided.

And, a one way ratchet mechanism for holding the nut is also provided. This ensures racking out, as desired, by holding or locking the nut in place in relation to the threaded screw rod. The nut is held firmly in place in all conditions but one—that being when the circuit breaker is fully racked in and the screw rod is still being turned as if further racking in is needed. Then, the nut is allowed to rotate and that prevents longitudinal movement of the circuit breaker with respect to the enclosure. And, by the new mechanism disclosed herein, the threads of the screw rod cannot become disengaged from those of the nut during racking in and upon reaching the racking in limit. This prevents cross threading of the nut and the screw rod when racking out is desired.

When proper and maximum racking in occurs, the nut is released from its stationary position and allowed to freely rotate along with and on the screw rod. As racking in to the proper amount occurs and the limit reached, the nut and screw rotate together. When racking out is desired, the one way ratchet mechanism mechanically engages and again stops the nut from rotating with respect to the threaded rod. Rotation of the screw rod to effect racking out, holds the nut stationary, again, i.e., no longer is allowed to free spin along with rotation of the screw rod, and that results in longitudinal outward movement of the circuit breaker with respect to the enclosure.

The ratchet mechanism holds the nut stationary during racking in and out and therefore further turning of the screw rod and its screw threads to rack out will allow for longitudinal movement of the circuit breaker with respect to the case. The ratchet mechanism ensures, however, that when the limit is reached, no further longitudinal movement of the circuit breaker will result in clockwise rotation of the screw rod.

Stated again, racking in is effected by a screw rod's clockwise rotation with respect to a held nut and, yet, over racking in is prevented by allowing the nut, even though threaded and held on the screw rod, to turn with further turning of the rod when the circuit breaker reaches its racking in limit into the enclosure (resulting in no additional distal or longitudinal movement). Upon reaching that racking in limit, the nut is released from being held by the bracket. And, the one-way ratchet will, when racking out is sought, hold the outside of the nut, allowing for relative rotation of the screw rod with respect to the held nut, to allow for relative movement of the circuit breaker with respect to the enclosure. The nut is secured in the bracket for racking out by turning the screw rod in the racking out (counterclockwise) direction. The ratchet mechanism allows for the nut to free spin or spin with and on the screw rod when the limit is reached.

This new invention provides for racking in and out, limits over racking in, maintains the threads of the nut on the threads of the screw rod and thus avoids cross threading (more of a problem for racking out than racking in) and allows for desired full racking out or complete withdrawal of the circuit breaker from the enclosure, all by providing a new, inventive and clever nut-holding bracket to the back of the enclosure.

In use, the present invention allows racking in of a circuit breaker into an enclosure or switchgear cubicle, or case, eliminates over racking in, allows for racking out when desired, and does so without disengaging the threads of the screw rod from the nut, unless the entire circuit breaker is desired to be completely removed from the enclosure. So, initial cross-threading during commencement of racking out is avoided.

SUMMARY OF THE INVENTION

Building onto the concept of a circuit breaker mechanically racking into and out of an enclosure, switchgear cubicle, cabinet, or case, by use of a rotative, externally threaded, screw rod secured to the bottom of the circuit breaker (with its longitudinal axis fixed in position beneath the circuit breaker) which cooperates with a bracket-held nut with internal screw threads located at the base or bottom and back of the enclosure (threads of screw rod being aligned with those of the nut, of course) the present invention provides a mechanism for racking in and out and for ensuring against over-racking in, without cross threading of the components during initiation of racking out. The present invention maintains threaded contact between screw rod and nut even after the racking-in limit is reached so as to avoid cross threading, especially otherwise a problem during the initiation of racking out.

The present invention provides that once fully racked in, the screw rod and nut spin together to prevent further and over racking in of the circuit breaker into the enclosure. This is accomplished by a release of the nut, allowing rotation of the nut when the desired degree of racking in has been reached. Further racking in is thus prevented. Prior to full racking in, a finger of a rotative round rod held in a bracket with the threaded nut and a paddle (aka a pawl) of the same rotative round rod (actually two such rotative rods are used) are held fixed in a bracket (by being blocked from rotation by square rods and their base legs overlying against the fingers) and cooperate with protrusions of the nut to block turning of the nut. The nut is prevented from rotative movement (allowing for longitudinal movement of the circuit breaker with respect to the enclosure, when the screw rod is rotated clockwise) by being held stationary i.e., blocked from rotation, by anti-torsion springs and abutting square-shaped legs of each of two inward and outward-only moving square rods (hereinafter the "in-out only movable rods" or "the square rods") also held in the bracket. The paddles, acting on protrusions of the nut, prevent free turning of the nut. Overlying of the base leg of the square rods on the fingers of the round rods held in the bracket block rotation of the round rods which have the paddles. The paddles extend into and prevent rotation of the nut by bearing against the welded joint where the protrusions of the nut are secured to the outside of the nut. The nut in the bracket is thus immobilized. That allows for racking in and racking out. Rotation of the screw rod and its threads within the threads of the nut results in racking in. Counter rotation of the screw rod and its threads within the threads of the nut results in racking out. The paddles or pawls (of the rotative round rods) interengage with outward protrusions or ears of the internally-threaded nut of the racking in and out mechanism. The paddles, like a pawl in a one way ratchet mechanism, block rotation of the nut during racking in and also during racking out, so long as the base legs of the square rods are pressed against the fingers of the rotative round rods. But the round rods can rotate and rotation of the nut not be blocked by the paddles of the rotative rods when the square rods are moved rearwardly, i.e., in the distal direction. Buttons on the square rods can be depressed, which move them rearwardly, and release the paddles from blocking rotation of the nut. The buttons are moved by the rearward movement of a cross beam at the rear of the carriage of the circuit breaker. Those buttons slide the square rods rearwardly and release the blockage of rotation of the round rotative rods. This allows the rotative rods to rotate and that allows for the nut to be released and to thus turn along with further turning of the screw rod. Over racking in is prevented.

The mechanical elements result in a one way ratchet mechanism, allowing for racking out when needed, allowing for racking in when desired, and, yet over racking in is prevented, without disengaging of the screw threads of the screw rod from the screw threads of the nut. The nut is immobilized during initial racking in and until the racking in limit is reached (whereupon the nut is allowed to free spin with the screw rod) and, yet, the nut is always immobilized (paddles interacting with protrusions of the nut) for any desired racking out.

When the racking in limit is reached, and as the buttons of the square rods are depressed by the breaker's carriage rearward movement, the round rotative rods are allowed to rotate. The legs of the square rods no longer block rotation of the rotation of the round rods. This allowance of round rod rotation enables the attached paddles to freely rotate outwardly from the nut's radial direction such that the paddles are now able to lift up and ride over the protrusions of the nut. No further racking in can occur.

But, a blocked rotation of the nut is desired for racking out, and this occurs by the paddles acting on the outwardly protruding ears of the nut. Those paddles can only rotate out of the way of the protrusions when the buttons are depressed and further turning of the screw rod in the racking in direction is tried. When the racking in limit is reached, when the round rods are allowed to rotate, as the buttons are depressed as the carriage moves rearwardly, the paddles are able to lift up and go over the protrusions of the nut. This only happens in the racking in or clockwise rotational direction of the screw rod and, only then, when the square rods are no longer blocking rotation of the round rods. Until the limit of racking in is reached and for all racking out, the paddles interact with the protrusions to stop rotation of the nut.

While racking in, but before the racking in limit is achieved, the legs of the in and out only movable square rods block the rotative rods from rotation, allowing their paddles to dig into or engage the ears of the nut-thereby holding the nut. The paddles act as one way ratchet mechanisms. They stop rotation of the nut so that turning of the screw rod clockwise or counterclockwise with its threads within the nut serves to pull in or rack out the circuit breaker into the enclosure unless the limit is reached. When that limit is reached, the paddles no longer hold the nut in place.

The present invention provides an inward limit for racking in of the circuit breaker with respect to the enclosure, switchgear cubicle or case. A pair of spring-outwardly biased "buttons" are provided to the front legs of the in and out only movable, square, non-rotative rods held in the bracket. When the carriage component of the circuit breaker moves rearwardly, its support or cross beam (extending horizontally at the rear base of the circuit breaker) will come into contact with those buttons (when it nears the racking in limit) and the cross beam will bear against and thus rearwardly (or distally) depress the buttons. This movement is in opposition to a spring bias for the buttons to be moved outwardly. The action of the cross beam of the carriage against the buttons moves the non-rotative, in and out moving only, square rods longitudinally rearward or distally and the base legs of the same which otherwise block the rotation (overlying fingers of the round rods) of the rotative set of round rods, no longer block their rotation. Those round rods with the paddles can now rotate. They are no longer prevented from rotation by the legs of the in and out only movable square rods bearing against and blocking rotation of the rotative and round rods.

During the first turn on the screw rod in the counterclockwise direction, for racking out, as desired, the buttons on the proximal ends of the square rod are still slightly or somewhat depressed. Therefore, it is merely the jamming of the paddles of the round rods into the weld joint of the protrusions on the outside circumferential wall of the nut, that inhibits the free rotation of the nut in the counterclockwise rotation. By turn 2 or 3 of the screw rod (depending upon the pitch of the threads) the buttons and the square legs have been reset forwardly by the spring bias of the buttons forwardly (towards the proximal end of the enclosure). Then, the square rods are again inhibiting rotation of the round rods (with the paddles). In the event it is desired to start a clockwise rotation of the screw rod, re-racking in the breaker into the enclosure, the nut would be held stationary until the buttons are again depressed, by action of the cross beam on the buttons when the limit is reached.

Yet, the paddles of the round and rotative rods, whenever the cross beam of the circuit breaker moves toward the front of the enclosure, i.e., in the racking out direction, are again held against the protrusions of the nut, and the paddles will block rotation of the nut. The paddles are spring biased back into interacting with the outward protrusions or ears of the nut and the action of the paddles against the protrusions is only disengaged when the round and rotating rods are allowed to rotate, when the clockwise rotation or racking in of the circuit breaker reaches its racking in limit and the buttons sufficiently depressed by the cross beam of the carriage.

The base of the fingers of the round, rotative rods are provided with chamfered edges which facilitate the rotation of the rotative round rods when the legs of the square rods are moved out of the abutment/blocking position. Co-rotation of the nut and the screw rod ceases longitudinal movement of the circuit breaker into the enclosure or cubicle. A limit to racking in is provided. And, yet, in contrast to the prior art, the racking in limit is not provided as a consequence of the removal or absence of the threads of the rod within the threads of the nut. Rather, the threads of the screw rod and those of the nut are maintained during racking in, as the device reaches its racking in limit and during initial racking out. Cross threading and the problems therewith are thus eliminated, at least for the racking out process.

And in racking out, accomplished by turning the screw rod in the opposite or counterclockwise direction, the paddles prevent the rotation of the nut by blocking the same as there is a blocking engagement of the paddles with the radially outward protrusions of the nut. The flat backs of the fingers of the round rods contact the inside surfaces of the sidewalls of the bracket as the legs of the square rod hold the round rods. Racking in and out can occur. The legs of the in and out only movable square rods will be in the blocking position against the fingers of the rotative round rods unless the square rods are moved out of overlying the fingers of the round rods.

Thus, when the screw rod and the nut turn together, no further racking in happens. The circuit breaker has reached its racking in limit. With the screw rod and nut threadingly connected and the nut not held stationary, the rod and nut turn together and no further longitudinal movement of the circuit breaker with respect to the enclosure or case will occur. Rather, there is a limit to the racking in motion. This is clearly desirable.

And, the cessation of the inward or rearward movement of the circuit breaker with respect to the enclosure or case is accomplished, mechanically, by the support/cross beam of the circuit breaker as it comes into contact with those buttons of the front faces of the in and out only movable square rods. This only happens when the breaker's cross beam pushes against the buttons of the in and out only movable square rods. That only happens as the circuit breaker nears its desired racking in limit position. When the circuit breaker is racked-in the full and proper amount for electric and mechanical connection, the cross beam has moved rearwardly or distally into the enclosure or case and comes into contact and depresses the heads or buttons of the pair of forwardly projecting, spring biased-forwardly, square legs of the in and out only movable square rods. The buttons are secured to the forward ends of the in/out square rods. When those buttons are engaged and pressed in by the rearward motion of the cross beam of the carriage of the circuit breaker with respect to the enclosure or case, the racking in limiting aspect of the device comes into play. Moving the square rods rearwardly or distally removes the overlap of their base legs upon the round rods. That allows the rotative round rods to rotate and releases the nut from being held. Rotation of the nut allows it to rotate with rotation of the screw rod and thus acts as a limit to over racking in.

The mechanical in and out only movable square rods interact with the rotative rods so that, during racking in, the base legs of the in and out only movable square rods hold upon and against a finger of each of the pair of rotative rods and secure them in place such that they bear against the inside surface of the bracket. They are held in place by the base legs preventing rotation of the rotative rods. Those fingers are blocked from rotational movement by the base legs of the in and out only movable set of square rods holding the fingers and the rotative rods in place. No rotation is possible. The rotative rods are provided with paddles or pawls. Those paddles interfere with rotation of the nut as the paddles block the nut's rotation by interacting with radially, outwardly projecting ears or protrusions of the nut.

Racking in occurs when the rotative rods cannot rotate and thus the screw rod will rotate into the stationery nut, drawing the circuit breaker into the enclosure or case. When the racking in limit is reached, the paddles can move out of the blocking path of the protrusions or ears of the nut and thus nut and screw rod turn together (and no longitudinal movement of the carriage is accomplished by further turning). And, racking out will occur, upon rotation of the screw rod in the racking out direction, counterclockwise, as the paddles block rotation of the nut in that direction. Only when the base leg of the in and out only movable square rods are moved distally or rearwardly, can the rotative rods turn and the flat back thereof become released from bearing against the inside wall of the bracket. A chamfered edge of the back of the fingers of the rotative round rods moves by slight rotation of the round rods to allow rotation of the round rods. Now, the nut is no longer immobilized. Racking in has reached its limit.

When racking out is sought, the paddles of the rotative rods again block against the protrusions of the nut. And, in addition, the square rods are spring biased back into blocking of the nut. The square rods (the in and out only moving square rods) are then in their initial position after just a few even partial turns of the screw rod and during initial racking out, whereupon once again, the rotative round rods are blocked and cannot rotate. This allows the paddles to block rotation of the nut. Racking out can be accomplished. And, this has occurred without releasing the screw threads of the rod from the screw threads of the nut. No cross threading with the circuit breaker within the enclosure is possible.

Thus, a limit to the racking in is provided-a result of the pushing in on the buttons, connected to the in/out only movable square rods, which have legs which otherwise block rotation of the rotative round rods (with the paddles) otherwise blocking rotation of the nut. As the nut can now rotate on the screw rod (it is no longer held in place by the paddles and protrusions) no longitudinal movement will result from further clockwise rotation of the screw. A mechanical limit is provided for racking in.

Allowing the nut to turn even with further turning of the screw, will not result in further longitudinal inward movement of the circuit breaker with respect to the enclosure. However, it should be appreciated that the nut and the screw are maintained mechanically engaged (threading is maintained between the two elements) so that when racking out is desired, there is no possibility of initial cross threading. The screw and its threads are already aligned and the threads of the nut properly threaded to the threads of the screw rod. In contrast to the prior art, a mechanism is provided for limiting racking-in which nevertheless still maintains the mechanical threading of the screw rod within the threads of the nut.

When racking out is desired, the screw rod is turned counterclockwise. The paddles (acting like pawls in a rotative gear) of the rotative set of round rods will, however, like a one way ratchet mechanism, block the rotation of the nut so that further rotation of the screw rod counterclockwise with respect to the now-held nut (paddles against the ears with flat back of finger of rotative round rods held against inside wall of the bracket) will result in longitudinal backing out movement of the circuit breaker with respect to the enclosure.

Thus, the present invention provides a threaded and rotatable screw rod which engages an initially held-in-position, internally threaded nut which, when the screw rod is turned in a first, preferably clockwise direction, and the screw threads of the rod engage the internal threads of the nut, results in racking in. That racking in, however, is limited inwardly by the depressing of the buttons (by a support member or cross beam moving rearwardly as the circuit breaker moves rearwardly or into the enclosure) with the buttons located on legs of a pair of in and out only movable square rods which (before depression of the buttons) are blocking the rotation of the rotative round set of rods having paddles projecting outwardly from the axis of the round rods which interact with radially outwardly extending protrusions of the nut. When the buttons are depressed, by rearward movement of the carriage of the circuit breaker with respect to the enclosure, by clockwise rotation of the screw rod, the legs of the in and out only movable square rods move rearwardly and no longer block rotation of the rotative round rods, and, thus, the nut is no longer held by the paddles. This is a limit to racking in, i.e., once the nut and screw rod rotate together because the nut is no longer held stationary (non rotatively) by the bracket with respect to the screw rod, no further rearward longitudinal movement can be accomplished, even with further turning of the screw rod. When the nut is held in position, when the rotative rods are not allowed rotation in a first direction, rotation of the screw rod results in racking in. When the buttons are depressed, by rearward movement of the circuit breaker into the enclosure or case a sufficient amount, the in and out only movable square rods no longer block the rotational movement of the rotative round rods and thus no longer hold the nut in a non-rotative position. Thus, a limit is reached as the nut of the bracket, on the threaded end of the screw rod, can turn along with turning of the screw rod's rotation. Over racking in is prevented.

Yet, as mentioned, the threaded rod portion of the racking screw is maintained in the threads of the nut so that cross threading when initiating racking out is eliminated. When the screw rod is initially turned counterclockwise, to back out its threads from the nut's internal threads, to rack the circuit breaker outward from the enclosure, the nut is held stationary by the paddles blocking the protrusions of the nut. This allows for longitudinal and outward movement of the circuit breaker from the enclosure. Once again, turning of the screw rod (this time counterclockwise) will result in longitudinal movement of the circuit breaker with respect to the enclosure or case. The interengagement of the paddles of the rotative round rods, during racking out, with the outward protrusions or ears of the nut, will prevent the nut from turning and hold it in place in the bracket so that turning the screw rod results in longitudinal movement, now racking out.

The in/out only movable set of square rods ensures against and prevents the rotative round rods from rotating during racking in. They allow the nut to be maintained in position. This allows the screw rod's rotation to screw into the nut and that pulls the circuit breaker inwardly into the enclosure or case. However, when the carriage/circuit breaker is fully racked in to a predetermined limit, the free rotation of the nut is allowed, a result of the in/out only movable square rods and the rotative round rods no longer blocking rotation of the nut, and this allows the nut and screw to turn together. A one way ratchet mechanism allows the nut in the bracket (at the rear, floor of the enclosure or case) to freely spin or rotate on and with even further rotation of the threads of the screw rod. Thus, further rotation of the screw rod will NOT cause any further longitudinal movement (rearwardly) of the circuit breaker or the screw rod with respect to the nut, as the nut will turn therewith. This free spinning of the nut with rotation of the screw rod means that over racking in of the circuit breaker will not occur and, yet, there is a further advantage of the ratchet mechanism, no disengagement of the threads of the screw rod from those of the nut is allowed to occur during racking in and upon reaching the limit so that the possibility of cross threading between screw rod and nut, when racking out is sought and initiated, is eliminated. This is an object and a principal purpose of the present invention.

The present invention ensures then that initial turning of the screw rod clockwise racks the circuit breaker in and, yet, no relative turning of the rod and the nut occurs after the full racking in has been obtained. Racking in is limited. And, yet, when the rod is turned in the other direction, counterclockwise, to rack the circuit breaker out of the enclosure or case, the ratchet mechanism will secure the nut (by interengagement of the paddles with the protrusions or ears of the nut). Racking out is accomplished. The in/out only movable square rods regain their blocking position, i.e., they prevent the rotation of the rotative round rods by contact of the legs of the square rods against the fingers of the round/rotative rods, which have the backs of their fingers against the surface wall of the bracket. The nut will be held in place by engagement of the paddles with the ears/protrusions of the nut so that the circuit breaker can be easily racked out, as desired. A video of the action of screwing in or racking in of the circuit breaker into the enclosure followed by the mechanical limitation or cessation of further racking in and then the action of removing the circuit breaker from the enclosure, whereby there is no possibility of cross threading as the screw with threads is secured to the nut, at least during initial racking out, is shown on You Tube at: https://youtu.be/sHN_gIz9PN4. It is respectfully requested that that video be incorporated by express reference and towards that end, Applicant, by its owner, will maintain for review by the public, as desired, the You Tube video for the pendency of the application process until this application issues as a US Patent, and it is expected to be available for viewing for the full duration of the enforceability of the issued US patent.

BRIEF DESCRIPTION OF THE DRAWINGS

FIGS. 7 (a) and (b) are assembled drawings of the front and rear of the bracket, similar to the exploded views shown and described in FIGS. 5 and 6;

FIG. 8 is a front perspective view of the bracket and principal components and showing in an enlarged sectional view, FIG. 8a, the blocking of rotation of the rotative round rod by the base leg of one of the in and out only movable square rods, immobilizing the nut from rotation by paddles preventing the nut from turning because they interact with the outward radial protrusions or ears of the nut, and allowing for racking in, as the buttons on the in and out only movable square rods are in their original or non-depressed positions, and in FIG. 8b showing the two pairs of rotative round rods and the in and out only movable square rods during racking in;

FIG. 9 is a front and perspective view of the bracket and principal components and showing in an enlarged sectional view, FIG. 9a, the unblocking of rotation of one of the rotative round rods by the leg of the in and out only movable square rod as it has been being pushed backwardly due to the buttons on the in and out only movable square rods being pushed rearwardly by the cross beam of the carriage of the circuit breaker; with FIG. 9b showing the two pairs of rods (round and square) when the nut is no longer blocked from rotation, thus limiting the racking in of the circuit breaker into the enclosure.

Figure 1:
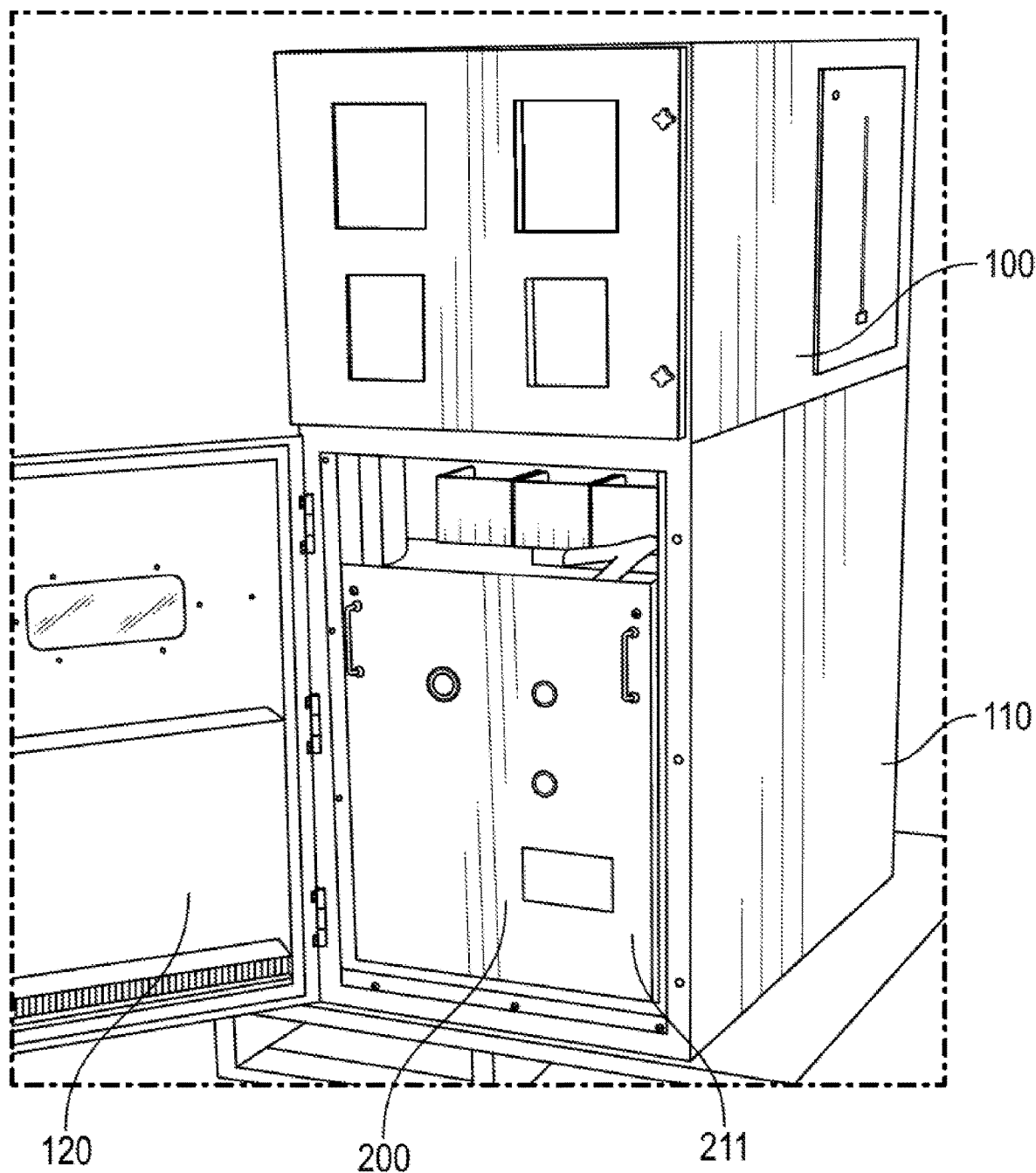
FIG. 1 is a front and side perspective view of an open case, enclosure or cabinet for a circuit breaker, showing the front panel of the circuit breaker in its "racked in" position within the enclosure with the door of the enclosure hingedly opened.

DETAILED DESCRIPTION OF THE INVENTION, THE DRAWINGS AND THE PREFERRED EMBODIMENT OF THE INVENTION

As can be seen and appreciated from the Figures, the present invention relates to a mechanism for facilitating the aligned racking in and racking out of a circuit breaker into its enclosure, switchgear cubicle, cabinet or case, while eliminating over racking in of the circuit breaker into the enclosure and, yet, not allowing cross threading of the screw rod with respect to a stationary nut which is used for the pulling out or racking out of the circuit breaker, when desired. For ease of understanding, the basic components of the device will be described herein but the teachings and Figures of U.S. Pat. No. 11,444,439, issued Sep. 13, 2022, are expressly incorporated herein and are intended to be helpful to the reader hereof for a full understanding of the background and purpose of the present improvement to the invention disclosed therein.

A "philosophy" of the present inventive mechanism is to eliminate physical stops at the end of the circuit breaker's racking in into the enclosure. By having no physical stops, an over-zealous mechanic cannot force and exceed the fully inserted position of the circuit breaker thereby damaging, destroying or exploding the device as it breaks through the stops and/or rear of the enclosure, shorting the medium voltage conductors phase to phase and ground.

The original or '439 Patent mechanism accomplished a limit to the racking in of the circuit breaker with respect to the enclosure by allowing the racking screw to "spin free" at the end of the racking in process. The turning of the threaded rod with respect to the stationary nut held to the bottom and back of the enclosure was accomplished by the racking screw rod being rotated at its head end. When the threads of the screw rod turned all the way through the threaded nut and ran out of threads on the screw rod within the nut during racking in, a limit was provided. After a segment of the screw rod with threads, a proximal length of the rod was provided without any screw threads. Thus, the threaded screw would not have unlimited inward movement as there were no more screw threads to interact with the internal threads of the nut. Without this limit, potentially and disastrously racking in of the circuit breaker further into the enclosure could result.

The '439 Patent concept works well; however it does have a low probability or downside in that there is a potential for cross threading of the proximal end of the threads of the threaded screw rod with the threads of the nut during the initial racking out process. This is a consequence of the disengagement of the threaded rod from the nut during the limit of the racking in process and mechanism. The possible cross threading of the '439 Patented mechanism is because the screw and nut need to re-engage on the very beginning of the very first thread of racking out. Such a cross threading could lock, bind, or seize the screw and nut together and trap the circuit breaker in the connected-in position within the enclosure. To safely then remove the circuit breaker, the switchgear would need to be de-energized and much effort would be needed to extricate the breaker from the enclosure. This can be difficult, costly and presents a set of safety risks.

The new system described herein maintains the basic concept of a longitudinal and threaded screw and matching nut, held stationary for racking in and then, as a limit-in mechanism, provides a release of the otherwise held in position nut so that it spins freely with and on the screw rod, at the end of the racking in process. However, in this new device, the nut and its threads will remain captured on the threads of the screw rod so as to not fully disengage the two components. The spinning free nut and limit to racking in feature is now accomplished by the nut being mounted in a specially designed holder or bracket that is provided with a mechanism which holds the nut stationarily for racking in and out and yet for limiting the racking in, releases the captured threaded nut of the bracket to rotate freely within its mounting.

The nut is initially captured and held securely within the mounting or bracket assembly. When the breaker is being racked into the enclosure, the nut is held securely so that rotation of the screw rod will draw in the circuit breaker into the enclosure. When the breaker fully becomes racked in, the circuit breaker's rear frame, with a cross member, support strut or cross beam, pushes against the force of two springs, which bias a pair of forwardly projecting square rods with projecting buttons located on the front of the nut-supporting bracket. This bracket is secured to the bottom and inside rear of the enclosure. The distal or rearward pushing on the buttons frees up the nut holding assembly and releases the threaded nut within the bracket assembly. The nut is now free to rotate along with rotation of the racking screw rod and even further rotation of the racking screw rod in the direction of racking in (clockwise) will not move the circuit breaker any further into the enclosure. Further and over racking in is thus prevented-a consequence of disengaging the hold of the threaded nut from the bracket and allowing that nut to spin and/or turn with further racking in direction or turning of the threaded screw rod.

Since there is now provided a mechanism for holding the nut and releasing it when the circuit breaker reaches a physical limit, racking the circuit breaker out of the enclosure needs to hold the nut. Once reheld from rotation, the breaker will simply be screwed out of the enclosure, substantially as done before. Stated differently, the counterclockwise turning of the screw rod will allow for racking out as the nut will be reheld in position by a set of rotative round rods and non-rotative (only capable of sliding in and out) square rods, the latter only capable of moving inwardly and outwardly in direction with respect to the bracket. These rods (round and square) provide a one way ratchet mechanism allowing for no longitudinal, in nor out, motion of the circuit breaker when the limit position is reached and yet allowing for simple racking out, as and when desired. A counterclockwise rotation of the threaded rod will result in inwardly directed paddles of the rotative round rods to come into contact with radially outwardly projecting protrusions or ears of the nut. The paddles will stop the nut from rotation. This holds the nut in a non-rotative position and allows for racking out.

The racking in, limit to racking in and racking out are functions of a mechanism which holds and releases the nut. The important benefit here is that since the threads of the nut and screw never separate during the racking in process and even upon reaching a limit of racking in, there is no chance of cross threading and locking the breaker into the connected and electrically "alive" racked in position within an enclosure, especially dangerous for racking out when the circuit breaker is within the enclosure.

With respect to the basic manner of racking in and out of the circuit breaker with respect to the enclosure, that is intended to be maintained as shown in the '439 Patent, i.e., a rotative threaded screw rod with external threads is provided and extends from front to back of the circuit breaker. It is rotative about the rod's longitudinal axis. This is the driving in and out mechanism when threaded into a stationary, interior threaded nut held near the base and back of the enclosure. The rod is provided with external screw threads matingly captured by the internal threads of the nut held in a bracket and located at the bottom, rear of the enclosure, cabinet or case. The rotative and clockwise movement of the screw rod with respect to the stationary and held threaded nut will serve to rack in the circuit breaker with respect to the enclosure. Clearly, rotation of the screw rod will cause its threads to travel within the threads of the nut and that, when the nut is held stationary, provides a longitudinal direction of travel (along the axis of the screw rod) to the circuit breaker with respect to the back of the enclosure, where the bracket and nut are located. This moves the circuit breaker within and into the enclosure. Turning the screw rod counterclockwise will result in the opposite direction of travel, along the screw rod's axis, i.e., that will result in racking out the circuit breaker from the enclosure. Both racking in and out require that the nut be held in the bracket so that rotation of the screw rod will translate to longitudinal movement of the circuit breaker with respect to the enclosure.

The present invention relates to a new, novel and clever mechanism for ensuring that the screw rod racks the circuit breaker in but only to its desired limit, maintains the threads of the screw rod within the threads of the nut, so as to avoid cross threading upon initial racking out, and allows then for racking out and full racking out even then with screw rod to nut disengagement, when desired. The threads of the rod are captured on the threads of the nut even when the circuit breaker is fully racked into the enclosure and then rotation of the rod in the opposite direction will allow translation or movement of the circuit breaker out of the enclosure and even result in disengagement of the threads of the rod with respect to the threads of the nut upon full racking out. While racking in, the nut will become threaded on the threaded rod and remain there even when a limit is reached. Then, the nut is allowed to freely spin along with further racking in or clockwise rotation of the screw rod, and if the two components turn in unison, then, clearly, mechanically, no further racking in of the circuit breaker with respect to the enclosure will occur. There will then be no longitudinal movement of the circuit breaker with respect to the enclosure. Even upon reaching the racking in limit, according to the present invention, the threads of the nut remains on the screw rod threads but the nut turns along with turning of the rod clockwise, ensuring both that no further racking in occurs (a desired limit to racking in) and the screw nut and rod are maintained threaded together, also as desired as that prevents cross threading at the initiation of racking out. The present invention prevents cross threading even when the screw rod is initially turned in the opposite or counterclockwise direction (as in the prior art) to initiate racking out of the circuit breaker.

A one way or ratchet mechanism allows for the nut to be held and screw rod to turn and pull the circuit breaker into the enclosure and then, when the racking in limit is reached, for the rod and nut to turn together even when further turning of the screw rod or more racking in is foolishly tried. Pulling the circuit breaker into the enclosure and to the limit position results in the nut and screw turning together. That results in no further racking in as longitudinal inward movement of the circuit breaker only occurs when the nut is held stationary and the screw rod turned clockwise.

Prior to the limit position, the rotative round rods of the bracket and the in and out only movable square rods (pairs of each are used) are housed in the rear bracket (serving to hold and release the nut). These cooperate as the holding and selective release mechanism for the nut. Those rotative round rods and square non-rotative rods of the bracket cooperate together and hold the nut for racking in and out and release the nut upon the circuit breaker reaching a predetermined racking in limit into the enclosure. When attempting racking out, rotation or turning of the screw rod counterclockwise with respect to the then stationary and reheld nut (the freeing of the turning of the nut along with and on the screw rod only happens in one direction or turning of the screw rod clockwise and then only upon reaching the racking in limit) pulls the circuit breaker out of the enclosure.

The invention provides a positive manner of stopping over racking in (which can be dangerous, expensive and time-sensitive to repair). Over racking in is prevented by a limiting mechanism, freeing the holding of the nut, and the mechanism ensures no cross threading of rod and nut even though a racking in limit is obtained, and yet, allows for racking out, as desired by securing the nut in position by interengagement of the paddles of the round rods with the radially extending protrusions/ears of the nut, as the screw rod is turned and rotated counterclockwise for racking out.

Turning now to the drawings, as can be seen in FIG. 1, an enclosure, case, cabinet or housing 110 is provided with a front panel 200, and a front, hinged door 120. This configuration is well known to those of skill in the art. To gain access to the rear of the circuit breaker for maintenance, replacement and/or repair, the door is opened and the circuit breaker 205 needs to be moved out (racked out) from the housing or enclosure 110. Electrical disconnection is first necessary and safety procedures followed. The circuit breaker is held in the enclosure upon a set of wheels (not shown in this Figure) forming a trolley-like or carriage mechanism on each side of the bottom of the circuit breaker 205. Those wheels are meant to glide and guide upon parallel tracks or rails located on the floor of the enclosure 110, recessed inside the interior side walls, and secured to the bottom of the enclosure, housing, case or cabinet 110. The rails extend from front (proximal end) of the enclosure towards the rear wall (distal end) of the enclosure 110.

As shown in FIG. 1, a pair of vertical handles 112 can be used for facilitating initial grasping and relative movement of the circuit breaker 205 into and out of the enclosure 110, but the '439 Patent shows a new and improved manner of easing the initial gliding and guiding in and out of the circuit breaker with respect to the enclosure 110, when the same has been first substantially electrically isolated and then mechanically substantially removed, i.e., after it is electrically and mechanically disconnected from the enclosure, case or cabinet and the screw rod sufficiently turned counterclockwise thereby releasing the circuit breaker 205 and its longitudinal and rotative rod from a stationary nut held on the bottom and at the rear of the enclosure. A horizontal extending handle with an upwardly movable second horizontal handle (preferably below the first handle) acts as a safety and release mechanism and can be provided as shown and described in the '439 Patent.

Figure 2:
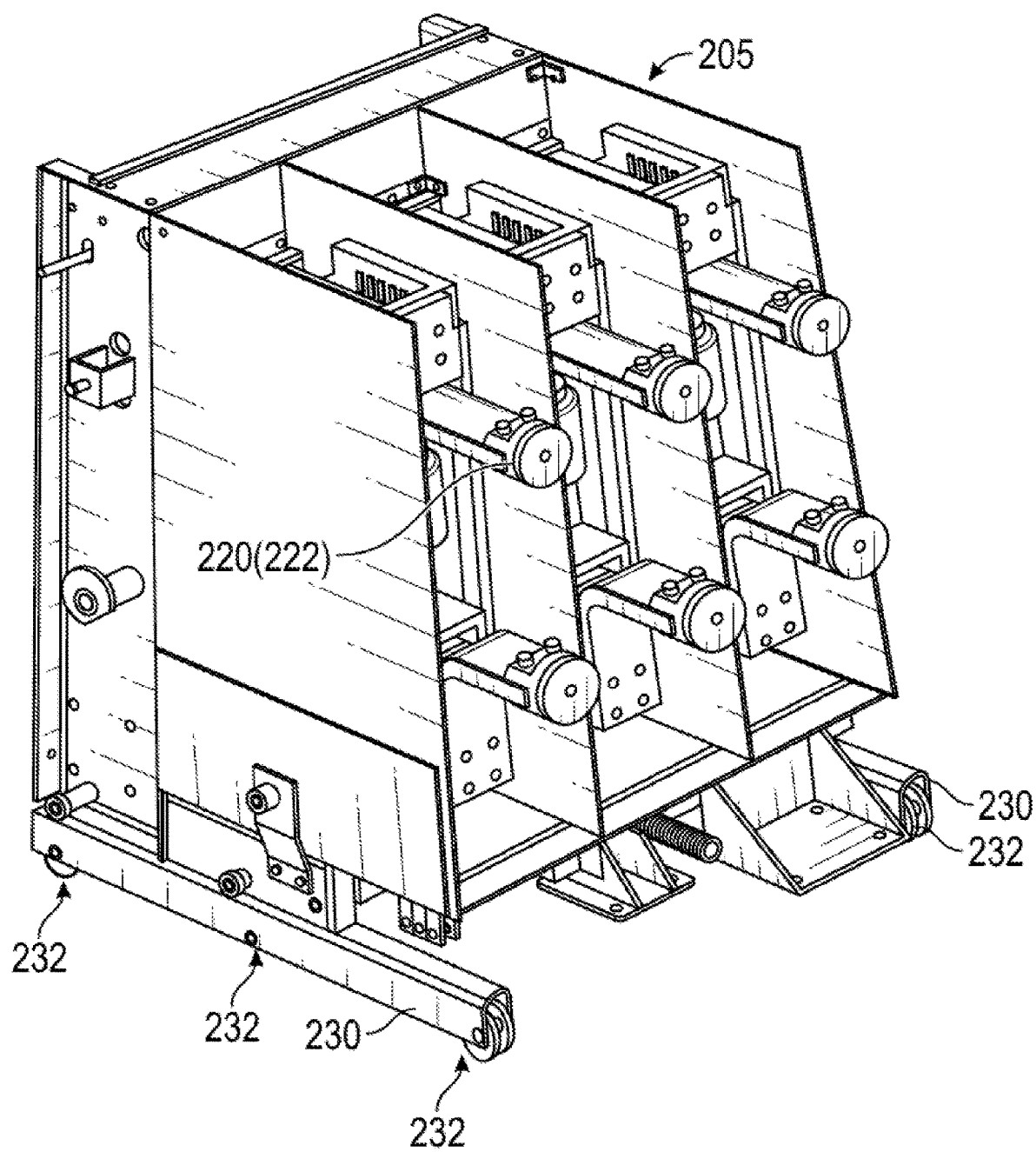
FIG. 2 is rear and side perspective view of the base portion of the circuit breaker as shown when it has been fully removed or "racked out" of the enclosure.

Turning to FIG. 2, the rear view of the circuit breaker 205 should be easily understood by those of skill in the art. This is the circuit breaker 205 as it will appear after being fully racked out of the enclosure or cabinet 110. The forward to rearward extending beam-like supports 230 extend along the opposed sides of the circuit breaker 205 and with rotative wheels 232 at the bottom, provide a carriage 235 for the circuit breaker. The wheels 232 are intended to ride upon a pair of parallel and spaced apart rails or tracks, held and secured to the bottom of the enclosure 110. By guiding the wheels 232 onto and over the spaced rails or tracks (not shown) and turning the screw rod clockwise with engagement of the distal threads of the screw rod within the threads of the nut of the rear-located, on the floor bracket for the nut, the circuit breaker 205 will be gently racked into the enclosure 110. With the present invention, that inward longitudinal motion is limited, i.e., racking in of circuit breaker 205 into enclosure 110 is limited so as to ensure against negative consequences of over racking in. However, when desirably removed—circuit breaker 205 from enclosure 110, counterclockwise rotation of the screw rod, according to the present invention, will also cause the wheels to glide and guide on the same rails/tracks to remove the circuit breaker 205 from the enclosure 110. The other components shown in this Figure are described in the '439 Patent or are not considered needed for a detailed description herein, to understand the present invention and it will be fully understood and appreciated by those of ordinary skill in the field of industrial circuit breakers and substations, as electrical and mechanical components of substations in industrial and large voltage environments.

Figure 3:
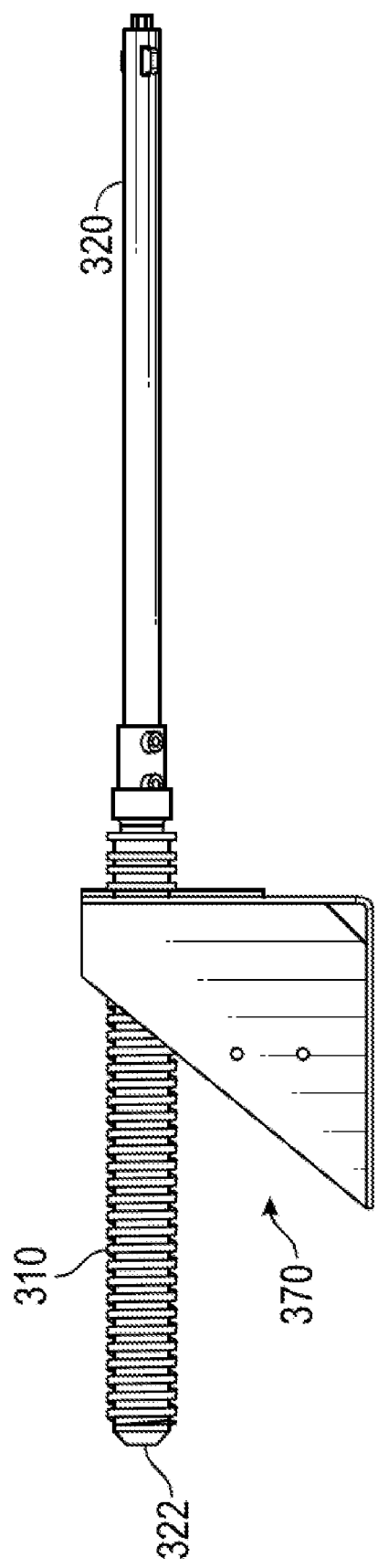
FIG. 3 is a partial, side view of the rear of the '439 Patent's mechanism for allowing the circuit breaker to be racked into the enclosure and shows the screw rod (rotatively secured on the bottom of the circuit breaker) and a bracket with holding nut and mating screw threads secured to the rear and base of the enclosure.
Figure 10:
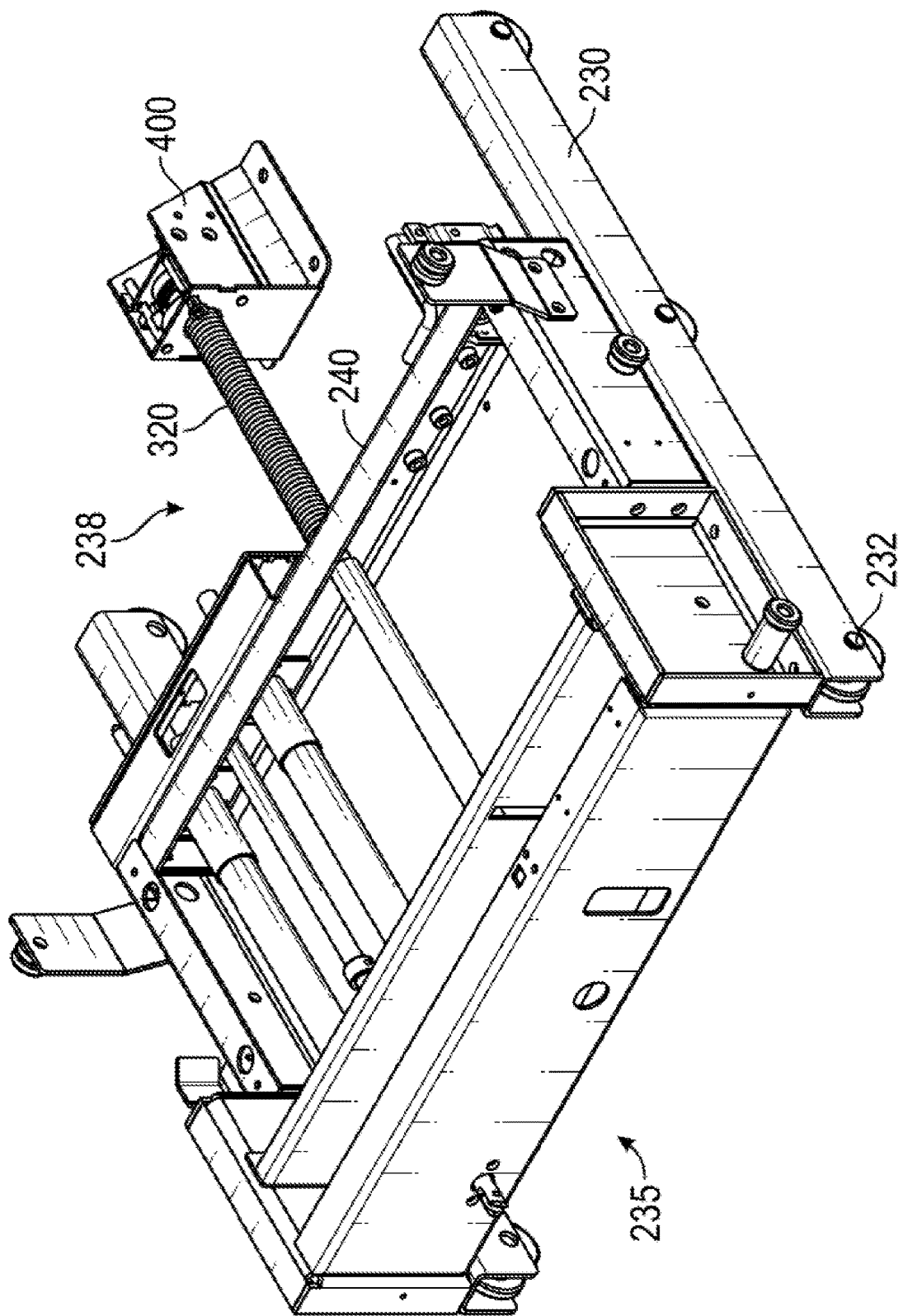
FIG. 10 is a partial, rear and perspective view of the carriage for the circuit breaker and shows the cross beam and the screw rod, as will be described.

At the bottom and center base of the circuit breaker 205, a rotative screw rod 320 is shown which extends from the front (proximal end) of the circuit breaker 205 to the rear (in the distal direction). Only the rear but likely a large length or segment of section of the screw rod 320 is provided with external threads 310. The rear of the screw threads 310 of the screw rod 320 can be seen in FIGS. 2 and 10. It is this screw rod 320 with external threads 310 (see FIG. 3) which cooperates with the internally threaded screw threads of a nut 430 held in a bracket 370 secured on the bottom and rear of the enclosure 110 which allows for longitudinal movement of the circuit breaker 205, i.e., racking in and racking out of the circuit breaker 205 with respect to the enclosure 110, switchgear cubicle, case or cabinet. One should appreciate that with the bracket 370 and the internally threaded screw threads of the nut 430 held on the floor of the cabinet, if the screw rod 320, with its external threads 310 mating into the threads of the nut 430, the rod's rotation clockwise and counterclockwise, from the front (proximal end) of the circuit breaker 205, will cause the circuit breaker, to which the screw rod is rotatively secured, to rack in and out of the enclosure 110, respectively. Traditionally, rotation of the screw rod clockwise will result in racking in and rotation of the screw rod counterclockwise will result in racking out of the circuit breaker 205 with respect to the enclosure 110, assuming the screw rod 320 is held by the threads of a stationary nut 430 held in the bracket 370 located at the rear of the enclosure 110. Clockwise rotation of the screw rod 320 captured by the threads of the nut 430 will cause the circuit breaker 205 to rack inwardly (until a limit is reached) while counterclockwise rotation of the screw rod 320 will cause the circuit breaker 205 to rack outwardly (at least until the threads are no longer engaged between screw rod and nut).

Figure 4:
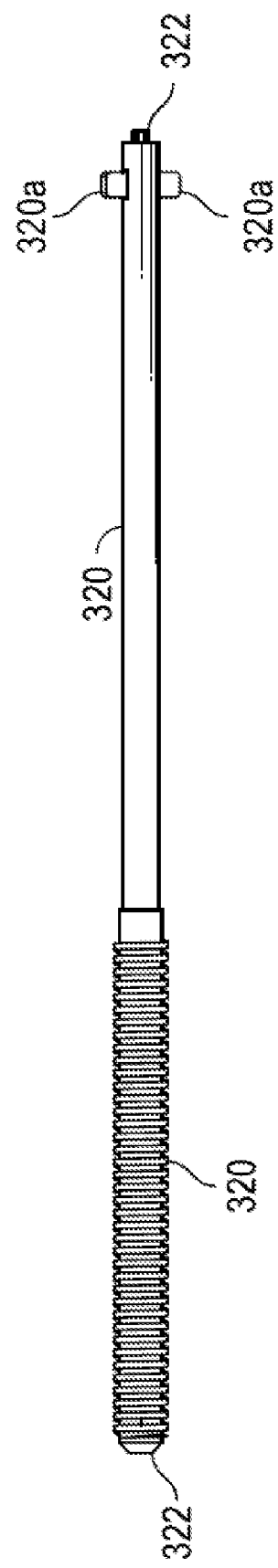
FIG. 4 is a side view of the threaded screw rod for facilitating the racking in and racking out of the circuit breaker with respect to the enclosure.

A screw rod 320 is shown in FIG. 4. It is basically a longitudinal rod which is threaded at its distal end but partially unthreaded for a section behind (in the proximal direction) its distal end or leading tip. The rod extends from the front panel 200 of the circuit breaker 205 through a holding bracket located below the front panel 200 of the circuit breaker 205, and to and through a bearing in a support bracket at the rear panel of the circuit breaker 205. As can be appreciated by reviewing the Figures, the rod 320 preferably extends through a second bracket held by a rear cross beam element. The screw rod 320 extends towards the holding bracket 370 for the nut. The bracket 370 for the nut 430 is preferably held to the rear and floor of the enclosure 110. The screw rod 320 is rotatively held below the circuit breaker 205 but is allowed to rotate both clockwise and counterclockwise within bearings of the screw rod-holding brackets. The distal end of the screw rod 320 is provided with an end tip 342 and a long set of external threads 310. The threads 310 extend from the tip 342 back toward the front or proximal end 322 of the screw rod 320. The rod actually is intended to extend slightly forward of the front panel of the circuit breaker 205 but only for a portion of the length of the rod 320. This allows the technician to access a portion of the screw rod for ease of rotation, as needed and desired. The rod can also be segmented and provided with a pair of U-bolts or connections with a segment being turned up and folded and held against the front panel 200 of the circuit breaker 205. This will save space. It should be appreciated that rotation of the front 322 of the screw rod 320, manually or via a power drill (connecting to ears 320a) results in rotation of the screw rod 320 and that, when the threads 310 are captured by a stationary nut 430 secured to a bracket 370 at the rear and floor of the enclosure 110, will allow the circuit breaker 205 to travel in (racking in—screw rod turned in a clockwise direction) and travel out (racking out—screw rod being turned in a counterclockwise direction) with respect to nut 430 held by the bracket 370 for the nut 430. The circuit breaker 205 will travel longitudinally with respect to the enclosure 110. Rotation of the screw rod 320 results in longitudinal movement or translation of the circuit breaker 205 along the axis of the screw rod 320 within and out of the enclosure 110. As can be seen in FIG. 18 of the '439 patent, a hand crank can be used to ease the manual rotation of the screw rod about its longitudinal axis. A power drill can be used, too, to more quickly rotate the screw rod within the threads of the nut, held in the rear bracket.

Figure 5:
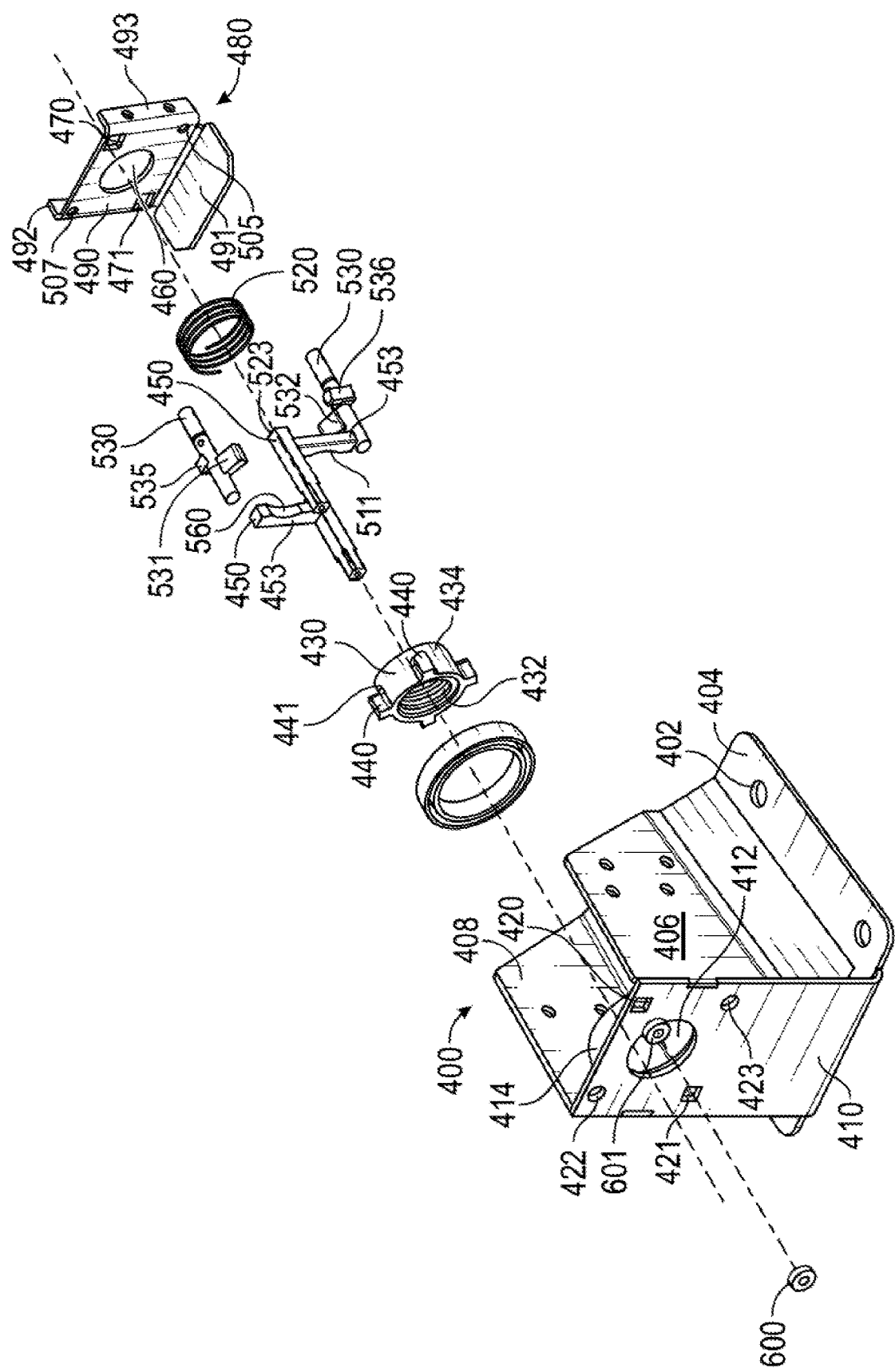
FIG. 5 is a front and exploded view of the bracket and principal components (secured to the base of the case or enclosure for the circuit breaker) and shows the internally threaded nut and the mechanism for releasing it upon reaching its racking in limit and shows a holding of the nut so that it is held stationary during initial racking in and, yet, when the circuit breaker is fully racked in and a limit reached, the mechanism allows for the threaded nut to stay connected to the screw rod and the two components turn together, even as continued turning of the screw rod progresses. This Figure shows the proximal end of the bracket, to be secured to the floor or base of the enclosure or cabinet/case and the manner of holding the nut so that, upon racking in and reaching the racking in limit, the nut will be allowed to rotate with the rotation of the screw rod and, upon racking out, the nut is secured in position so that counterclockwise rotation of the screw rod will cause or translate into longitudinal movement of the circuit breaker with respect to the enclosure.
Figure 6:
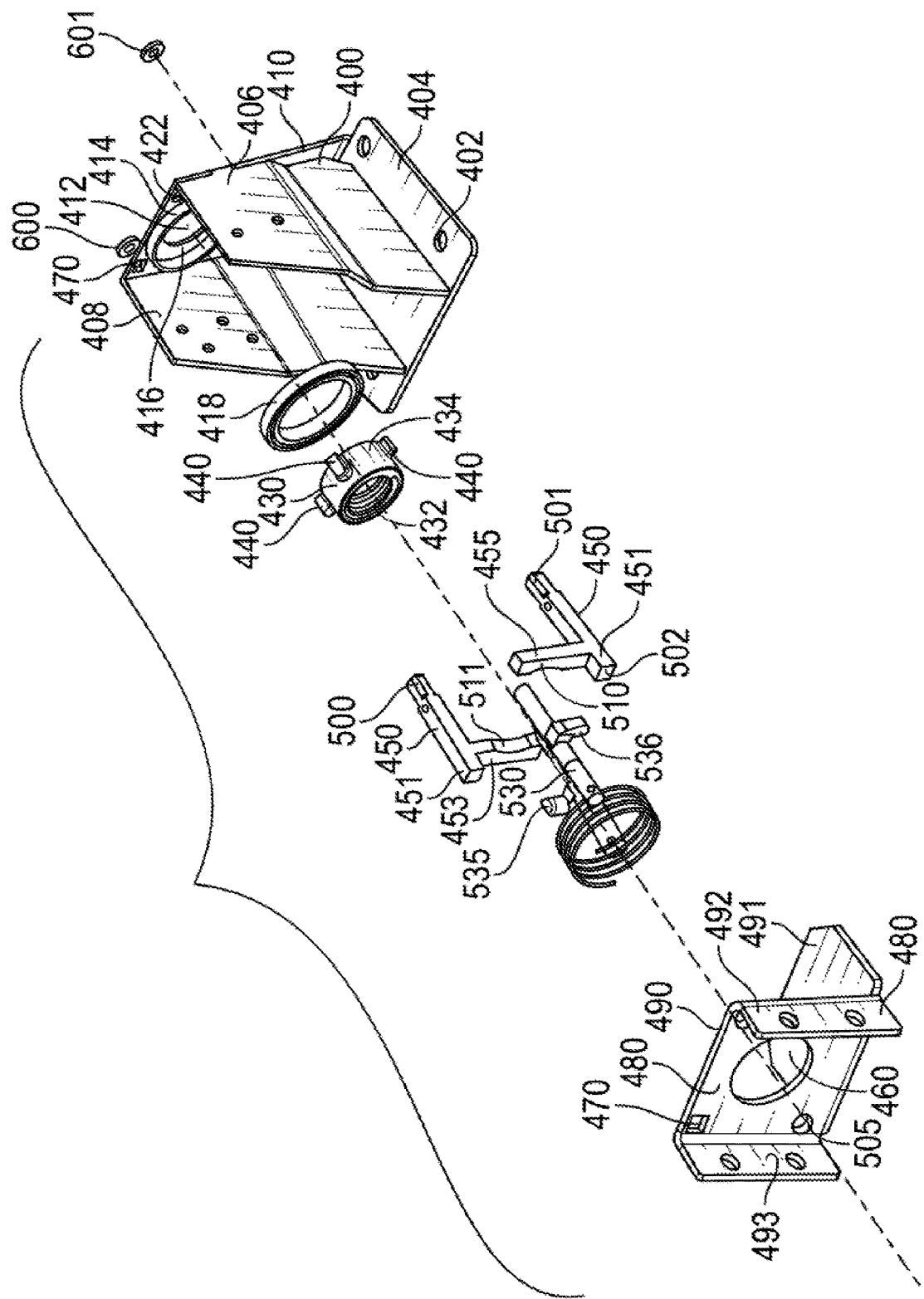
FIG. 6 is another view of the bracket and principal components, a rear and exploded view, and shows the rear or distal end of the bracket secured to the floor and back of the enclosure, where the screw threads of the screw rod of the circuit breaker's carriage would extend through an aperture of the bracket when the circuit breaker is fully racked into the enclosure.

Turning attention to FIG. 5, an exploded rear bracket 400 for holding the nut 430 is shown with apertures 402 passing through flanges on its base 404 for receipt of screws and corresponding nuts/bolts for facilitating the securement of the bottom base 404 or plate to the rear and bottom surface of the enclosure, case or cabinet 110. Two opposed, upwardly extending side plates 406 and 408 are provided to the bracket 400 as is a front plate 410. The side plates 406 and 408 are preferably welded to the base 404. The front plate 410 is preferably welded to the front edges of the side plates 406 and 408. As can be seen, near the top of the front plate 410 is a large round aperture 412, and an encircling, rearwardly projecting back ring 414, which is attached to the rear of the front plate 410, to define a holding seat for a bearing 418. The bearing 418 fits within the holding seat defined by the interior of the back ring 414. The front plate 410 is provided with a pair of diagonally-opposed square-shaped apertures 420, 421, outside of the circumference of the aperture 412 and about the holding seat 416 and a second pair of diagonally-opposed (but circular) apertures 422 423, passing also outside of the ring 414 and beyond the circumference of the aperture 412. Toward the rear of the side plates 406,408, apertures are provided for securing (along with welding, if desired) a rear plate or bracket component 480 between the side plates. It, too, has aligned diagonal square-shaped apertures (470, 471) and round apertures 505,507 surrounding a large round aperture 460. Aperture 460 is aligned with aperture 412. Square shaped apertures 470,471 are aligned with apertures 420, 421 and round and smaller apertures 505, 507 aligned with apertures 423 and 422. The round and square apertures are the supports for round rods and the square rods, to be described.

A bearing and race holder 418 is seated in the holding seat 416. Located behind (distal) the bearing 418 is a (basically round on the outside) nut 430 with internal screw threads 432 that mesh and engage the external screw threads 310 of the screw rod 320. The forward segment and outside circumferential wall 434 of the nut 430 is provided with one or more (preferably four) spaced, radially outward extending protrusions or ears 440 (or protruding fins on the nut's exterior surface). The tops or outside edges of the protrusions are held within the bearing 418. The protrusions 440 only extend backwardly for a portion of the rearward length of the outside curved wall of the nut 430. A helical spring 520 extends around the rear of the nut 430 (behind the ears or protrusions 440) its front coil abutting the rear edges of the protrusions 440, and its rear coil/surface abutting the front face of the rear plate 480, surrounding the large aperture 460. The spring 520 tends to push the nut 430 forwardly but is held around the nut by the outside surface of the nut 430 and the protrusions/ears 440. The spring is located on the rear circumferential surface of the nut 430.

The protrusions or outwardly extending ears 440 of the nut 430 cooperate with the paddles or outwardly extending blocks 531, 532 of the circular-ended or rotative round rods 535 or latch rods. A pair of the rotative round rods 535 are provided with their ends rotatively held by opposed apertures 422, 505, 423 and 507. The paddles/blocks 531,532 are welded to the rotative round rods and extend inwardly therefrom towards the outside surface of the nut. The paddles act like pawls of a ratchet mechanism and engage the protrusions 440 of the nut 430. The paddles 531, 532 allow for the nut 430 to be fixed and not rotate (when the paddles 531, 532 are between the spaces of the protrusions, bear against the ears and the circuit breaker has not been fully racked in. Yet the nut 430 can rotate or spin when the paddles 531, 532 are rotated and lifted slightly upwardly and out of the way of the protrusions 440 or ears. Springs not shown) connected between ends of the rotative rods and the side walls or panels of the bracket 400 bias the round rods so that the paddles are pulled down between the spaces of the protrusions 440. If the round rods rotate, the paddles 440 no longer block rotation of the nut 430. The round rods 535 are, during racking in and racking out of the circuit breaker 205 with respect to the enclosure 110, initially positioned so that the paddles 531,532 are in the spaces between the protrusions. However, when the circuit breaker reaches its rear racking in limit, the mechanism which holds the round rods from rotating, which in turn holds the nut stationary, releases the nut 430. That allows the nut and screw rod to rotate together, meaning, further rotation of the screw rod will not result in any further racking in of the circuit breaker 205. When the nut 430 and screw rod 320 turn together, the paddles 531, 532 can lift over the protrusions 440. Yet, when racking out is desired, the paddles are found within the spaces between the protrusions 440 so that the nut 430 cannot rotate and thus, turning the screw rod in the racking out direction (counterclockwise) will result in racking out.

The paddles 531, 532 direct engagement with the base of the ears or the protrusions 440 of the nut 430 prevent rotation of the nut but when the round rods are allowed to rotate upwardly and out of the way, the nut 430 can turn and when it turns with rotation of the screw rod 320, no racking in or racking out occurs. No longitudinal movement of the circuit breaker occurs when the nut is allowed to free spin with the rotation of the screw rod. The pawls, paddles or blocks of the round latch rods block/ordinarily prevent rotation of the nut. But, when the racking in reaches its predetermined limit, the nut is allowed to rotate. The paddles, via the spring bias, are located between spaces between the protrusions/ears. When the screw rod is rotated clockwise, the nut is held by the round rotative rods not being able to rotate as a consequence of those rods being held immobile by the square rods. However when the square rods are moved rearwardly (by depressing the buttons of the square rods, see below) the round rods are released and no longer hold the nut stationary and thus nut and screw rod rotate together.

The paddles extend between adjacent protrusions or ears of the nut and, in this manner, lock the nut in position if rotation in the counterclockwise direction is attempted as for racking out. When the paddles are allowed to be rotated out from the spaces between the protrusions/ears of the nut (by the rotative rods being allowed to rotate and no longer being blocked from rotation by the square rods)—a function of rearward movement of the base ends of the L-shaped legs of the in and out only movable square rods, then the nut is free to rotate, with and on the screw rod, and no additional longitudinal translation or movement of the circuit breaker with respect to the enclosure or case will be accomplished. This happens when the circuit breaker reaches its racking in limit.

Holding and releasing of the nut is accomplished by a pair of L-shaped square rods held in the bracket. These can only move forwardly and backwardly, i.e., proximally and distally with respect to the front panel 200 of the enclosure. The pair of basically L-shaped square-ended rods (called in and out only movable square rods) 450 are secured with their front square ends passing though the square shaped apertures 420 and 421 on the front bracket 400. Their rear butt ends (also square shaped) are held, non rotatively, in square apertures 470 and 471 of the rear panel or face of the bracket. These two L-shaped rods slide forwardly and rearwardly. They are similar to one another but one is supported upside down to the other as held in the bracket 400; one has its base leg 453 extending downwardly while the other has its base leg 455 extending upwardly (see FIG. 5).

The L-shaped, square-ended rods 450 have forward square shaped ends and short, rearward butt extensions or square shaped ends 451. The L-shaped rods longitudinally slide between the opposed front plate 410 and rear plate 480 of the bracket 400 i.e. between the aligned square shaped apertures (420, 421, 470 and 471) and only can move forwardly and rearwardly. These do not rotate. They only move distally and proximally with respect to the front panel of the rear bracket. Their square shaped front ends are biased forwardly by springs held between the front face of front plate 410 and the rear faces of large and round buttons 600, screwed or secured to the front, square ends of the L-shaped rods, in front of the bracket 400. As a consequence of the springs, the L-shaped rods are forwardly or proximally biased. The buttons and thus the L-shaped and square rods 450 move rearwardly, against the force of the springs (not shown but behind the buttons) until the racked in limit is reached. The base legs 453 of the L-shaped square (in cross section) rods, called in and out only movable square rods, are, while racking in and out, held against the inside flat-like edges of the fingers 533 of the rotative round rods 535. This holds the paddles 531,532 projecting from the round rods 535 in between the spaces of the protrusions 440 and thus holds the nut 430 in place and prevents rotation of the nut 430. When the in and out only movable square rods 450 are moved rearwardly, the base legs slide off of the fingers 533 of the round rods 535 and will release the flat backs 53,537 of the fingers 533 from being held against the inside side plates 406, 4081 of the front bracket 400. Stated differently, when the base legs 453 of the in and out only movable square rods 450 press and bear against the inwardly directed face of the fingers 533 (see FIG. 8*a*) the nut 4530 is held immobile and the rotative round rods 535 cannot rotate, a consequence of the paddles 531,532 of the round rods held between the protrusions 440 and not allowing rotation of the nut 430 by bearing against the protrusions 440. When those base legs 453 are moved distally or rearwardly, by depressing of the buttons on the front of the in and out only movable square rods 450, the rotative round rods 535 are released and the nut 430 is able to turn as the paddles in the spaces of the protrusions are capable of riding over the protrusions 440. This allows the paddles to ride over the protrusions, but only when the screw rod is turned clockwise and only when the limit has been reached for racking in. There can be no rotation of the nut when the screw rod is turned counterclockwise as the protrusions are blocked from rotation in that direction by the paddles and the protrusions. The paddles cannot rotate out of the way when the screw rod is rotated counterclockwise.

The paddles, in combination with the protrusions, allow rotation of the nut only when the racked in limit is reached. The paddles 531 and 532 of the rotative/latch and round rods 535 (the rods with the round shaped ends extending between the front and rear plates of the bracket 400) will move over and out of the way of the protrusions but, only when the square rods are moved backwardly to allow the fingers of the rotative rod to be exposed, i.e., no longer overlain by the base legs of the square rods 450. When the rotative rod is allowed to rotate, because it is no longer held in place by the square rods, the nut can rotate with the screw rod. That prevents further racking in. Yet, when the screw rod is rotated counterclockwise or even clockwise, but before the limit is reached, the nut is not allowed to rotate and the screw rod will control racking in and racking out. The interaction of the base legs of the square rods and the finger of the round rods controls the rotation or fixing of the round rods which controls the ability of the nut to rotate or not. When the round rods are blocked from rotation, the nut 430 is blocked from rotation, as the paddles engage the protrusions. The front and rear round ends of the rotative rods fit in the round apertures 420, 421, 507 and 505 of the front and rear plate 410 and 480.

As can be seen in the FIGS. 8, 8*a*, 8*b*, and 9, 9*a*, and 9*b*, the base legs 453 of the square rods 450 sit inside of fingers 533 of the rotative or round latch rod 535*s*. The base legs of the in and out only movable square rods (or L-shaped rods) 450 when overlaying or inside the fingers 533 of the rotative or latch round rods 535, sandwich the fingers 533 of the latch round rods 535 to the inside of the side plates 406,408 of the bracket 400 and thus prevent rotation of the latch or rotative round rods 535. The fingers 533 of the latch round rods 535 have a flat back/plate or base 701 which unless the round rods are rotated out of the way sit against and flush on the inside of the side plates 406,408. The flat back 701 prevents rotation of the round latch rods 535 if the base legs 453 of the square rods 450 (the in and out only movable square rods) block rotation of the fingers 533 of the rotative round rods 535. However, if the square rods 450 (the in and out only movable square rods) are pushed rearwardly (by rearward movement of the buttons 600) such that their base legs 453 no longer overlie or are inside the surface of the fingers 533 of the rotative round rods 535, then the rotative rods can rotate. This means that the paddles 531,532 no longer block the rotation of the protrusions 440 and the nut 430. This allows the nut 430 and the screw rod 320 to turn together—and a limit to the racking in is thus provided. Stated differently, when the square rods 450 or the in and out only movable square rods are moved rearwardly (by contact of a cross beam 240 with the buttons 600 of the bracket 400), their base legs 453 slide rearwardly and thus unblock rotation of the rotative round rods 535 and the paddles 531, 532 can move over the protrusions 440. The fingers 533 rotate about the axis of the rotative round rods 535 and the chamfered ends 703 of the fingers 533 (at the base of the flat back 701 of the fingers 533) then bear against the inside wall of the side of plates 406,408 of the bracket 400. The paddles can rotate out of the way of the protrusions or ears 440, and that allows rotation of the nut 430.

The rotative rods 535 have round ends which are rotatively supported in the apertures 422, 423 of the front plate and apertures 507, 505 of the rear plate 480 of the bracket 400. They can rotate but only if not blocked from rotation by the base legs 453 of the L-shaped square rods 450 (the in and out only movable square rods) and their abutment with the inside flat inside surfaces of the fingers 533 of the rotative round rods 535. Once those rotative round rods 535 are allowed to rotate, the paddles 531, 532 are no longer blocking rotation of the nut 430. But torsion springs are provided and tend to bias the mechanism so that the paddles return to between the spaces of the protrusions. The paddles can jump over the protrusions but only if the round rods 535 can rotate. And that only happens when the racking in limit is reached, the button pushed rearwardly and the square rods expose the round rods for rotation.

The operation is as follows: preventing rotation of the nut during racking in but when the limit is reached, rotation of the nut is allowed, and, yet, when the screw rod is turned in the counterclockwise direction allowing for racking out. The paddles prevent rotation of the nut by bearing against the protrusions except when the nut is allowed to rotate by the release of the rotative round rods. Release of the nut results in no further racking in, as the nut will rotate along with and upon the screw rod. However, the turning of the screw rod in the counterclockwise direction, for racking out, will also prevent rotation of the nut in the counterclockwise direction. This is because the paddles will always bear against the protrusions when racking out is occurring and during racking in unless the limit of racking in is reached and the square rods allow the round rods to rotate which allow the paddles to skip over the protrusions.

The rear plate 480 of the rear bracket 400 has a front surface 490, a bottom plate 491 and a pair of opposed, rearwardly extending side plates, 492 and 493. Apertures are provided through the front surface of the rear piece of the bracket, diagonally opposed about the aperture 460, as well as into the side plates 492 and 493. These apertures 470, 471 are support holes for the rear or butt ends 451 of the L- or square shaped rods 450. Individual square ends 502, 503 of the L-shaped rods 450 pass through and are support there for sliding forwardly and backwardly (when spring biased forwardly and when pushed back by the cross beam of the carriage, respectively). The rear plate 480 of the bracket 400 is welded or otherwise secured to the side panels 406, 408 of the bracket 400. It will be appreciated that the inside surfaces of the base legs 453 of the L-shaped square rods 450 are provided with inwardly directed curved or concave surfaces 510 and 511, which extend around and space the square rods 450 from the circumferential and mating outside and round surface 441 of the rear of the nut 430 (see FIGS. 8 and 9). A large spring 520 is seated between the front surface 490 of the rear plate 480 of the bracket 400 (surrounding the large aperture 460) and the rear of the nut 430. The spring 520 is ensured not to project forwardly by the rear edges of the protrusions or ears 440 which provide stops for the front end of the helical spring 520.

A pair of round-ended rotative rod elements 530 extend with their front ends passing through the front round apertures 422,423 of the front plate 410 of the front bracket 400 and their rear rounded ends passing through the round apertures 505,507 of the rear plate 480 of the rear of the bracket 400. These rod and round elements 530 are provided with inwardly directed paddles, fins or blocks 531, 532 (acting as pawls which act in cooperation with the protrusions or ears 440 of the nut 430) and a pair of opposed, rearwardly located finger segments 533 (one directed up, the other down for the pair of rods 530). The outside walls of these fingers 533 present a flat back 536, 537 and can be flush against the opposed inside walls of the bracket 400 or the base or flat back 701 of the fingers 533 with chamfered edges 703 will be against the walls of the bracket, if the round rods 535 are allowed to turn. These allow the rods to rotate (when the L-shaped square rods 450, i.e. the in and out only movable square rods are removed from blocking the rotation of the round rods 530) and the chamfered ends 703 rotate to rest adjacent the inside walls of the side plates 410 of the bracket 400. Springs extending between the side plates 406, 408 of the bracket and a screw at the end of the round rotative rods 530 pull the rotative round rods down, so that their paddles 531, 532 are again between the protrusions 440. However, the springs and the paddles do not prevent rotation of the nut, when the over racking in limit has been reached and the rotative round rods allowed to rotate.

A pair of large buttons 600, 601 are secured over and to the front surfaces of the L-shaped square rods 450 (in and out only moveable square rods) and are located in front of the front plate 410 of the bracket 400. These extend forwardly or proximally and provide front facing round surfaces for coming into contact with the cross support beam 236 of the carriage 235 of the circuit breaker 205 as it moves rearwardly into the enclosure 110, case or cabinet. The buttons 600 are secured to the front flat faces of the L-shaped square rods 450 by screws passing through the center of the buttons 600 and into the middle of the front, square and flat surfaces of the square leg rods 450. The rear of the buttons 600 each hold a coil spring between them and the front plate 410 of the bracket 400. These will bias the L-shaped square rods 450 to project proximally or forwardly i.e., in the direction of the front panel 200 of the circuit breaker 205. These two springs (not shown) tend to bias the L-shaped square rods 450 forwardly and into their base leg-against-the fingers blocking position for preventing rotation of the rotative, round rods 530. A larger spring 520 pushes the nut 430 forwardly, too, by bearing against the rear of the ears or protrusions 440 of the nut 430 and the front of the rear plate 480 of the bracket 400.

The interplay of the base legs of the in and out only moveable square rods 450 and the fingers 533 of the rotative round rods 530, freed for rotative movement by rearward or distal movement of the in and out only movement square rods 450 (by depressing the buttons 600 on the front square faces 433, 435 of the square rods 450) results in a limit to the racking in or the relative rearward movement of the carriage 235 is allowed. Either the paddles 440 acting directly on the protrusions 440 of the nut 430 and the fingers 533, held by the base legs 453 of the square rods 450, block rotation of the nut 430 or they allow a degree of rotation of the nut 430. If "freed" to rotate, it is because the base legs 453 of the L-shaped square rods 450 have moved rearwardly, with the base leg uncovering the fingers of the rotative round rods 530. That allows further clockwise rotation of the screw rod 320 and the paddles moving up and over the ears or protrusions 440 of the nut 430. The nut thus rotates freely. No more racking in occurs.

However, counterclockwise rotation of the screw rod will again result in the paddles 531, 532 blocking rotation of the protrusions 440 which means the nut is held stationary. This means that racking out can be effected by further turning of the screw rod, counterclockwise. Blocking the rotation of the nut 430, by blocking rotation of the protrusions 440 of the nut 430, allows for longitudinal movement of the circuit breaker 205 with respect to the enclosure 110.

This allows for racking out as the screw rod 320 is turned with respect to the now-stationary reheld nut. When the screw rod 320 is turned counterclockwise, the device allows for the circuit breaker 205 to be removed from the enclosure 110 as the nut 430 is again held from rotational movement with respect to the screw rod 320 by the mechanical blocking action of the paddles 531, 532 and the protrusions 440 on the outside of the nut 430.

Racking in is able to be done (by clockwise rotation of the screw rod), a limit on racking in is provided (when the buttons are depressed by rearward movement of the carriage and circuit breaker with respect to the enclosure), no removal of the threads of the screw rod from the nut occurs as a consequence of the limit to the racking in, and the circuit breaker can be removed or racked out, when desired (by counterclockwise rotation of the screw rod).

When the round rotative 530 rods are in their blocked condition, the paddles 531, 532 block any counterclockwise rotation of the nut. And, the nut is prevented from clockwise rotation, too, unless the square rods are moved rearwardly so that their base legs no longer block rotation of the round rods. Pushing rearwardly or distally in on the buttons (carriage moving rearwardly to the racking in limit within the housing or enclosure 110) allows the round rods 530 to be released and to rotate. Pushing in on the buttons pushes the base leg of the square rods 450 past the fingers 533 of the round rotative rods 530. This allows the round rods to rotate, the nut 430 to be freed for rotation, and the paddles can then move over the protrusions even if further racking in is tried. Yet, when racking out is desired, those paddles dig into the weld joint between the base of the paddles and the outside wall of the nut to once again prevent nut rotation. That allows for instant racking out, as desired.

In preparation of operation, the bracket 400 (comprised of the front plate, the side plates, the bottom flanges and the rear plate and associated rear bracket components) holds the nut 430 with its internal screw threads defining a central aperture, with the screw rod 320 extending towards the apertures 412 and 460. The operator can advance the screw rod on the circuit breaker so that the external threads thereof come into engagement with the internal threads of the nut. Then the operator can start the racking in of the circuit breaker into the enclosure. To do this, as mentioned, a simple pushing on the front of the circuit breaker into the case/cabinet is started so that the wheels align with the tracks of the case. Further pushing of the circuit breaker will cause the leading threaded tip of the rod to be received into the aperture 412 of the front plate of the bracket and then into contact with the internal threads of the nut. Further clockwise turning of the screw rod will result in longitudinal motion of the circuit breaker into the enclosure, i.e., racking in is accomplished by turning of the screw rod in a clockwise direction which will cause the tip of the screw rod to pass through the stationary and mechanically held nut. As the nut is held, by the base leg of the in and out only movable square rods bearing against the fingers of the rotative round rods, and the resultant interaction of the paddles of the rotative rods on the protrusions of the nut, the threads of the screw rod turning within the held nut translates into longitudinal axial motion of the circuit breaker into the enclosure.

It is desired, as mentioned, for the internal racking in of the circuit breaker to not go beyond a limit, as that would result in possible damage to the system. That could be expensive and difficult to deal with. As a consequence, the present invention is provided with a limiting mechanism to prevent over racking in of the circuit breaker into the enclosure. When the cross beam (beam 240 of FIG. 2 and see FIG. 10) for example, or any cross-directed support member of the carriage extending between the sides of the circuit breaker) racks in rearwardly, it will, at some point, have its rearward directed vertical face come into contact with the buttons 600 of the front face of bracket 400. Those forwardly biased buttons (extending from the fronts of the L-shaped in and out only movable square rods 450) will become depressed by movement of the cross beam of the carriage of the circuit breaker. Further clockwise rotation of the screw rod 320 will result in the cross beam coming into close contact with and against the fronts of the buttons 600 which will bear against the front surface of the front plate of the front of the bracket even against the forward bias of the springs pushing the buttons forwardly. The rearward pushing of the buttons connected to the front of the L-shaped rods (a result of racking in) thus moves the base legs thereof to a position distal or beyond the fingers of the rotative rods 530. They are no longer held in position. The rotative rods can now rotate out of the way and this frees and allows the turning of the nut 430 along with further clockwise turning of the screw rod. The paddles 531,532 move over the protrusions 440 of the nut 430. This allows the nut to rotate, on the threads of the screw rod, and since the nut and screw rod are both now able to turn, even further rotation of the screw rod clockwise will not result in longitudinal movement of the circuit breaker further into the enclosure 110. In effect, the screw rod and the nut will rotate together but no further movement of the circuit breaker 205 within and into the enclosure 110 will occur. Thus, a limiting, racking in mechanism is provided. Yet, racking in has been accomplished and the limit to the racking in accomplished while maintaining the screw threads of the screw rod to be within the screw threads of the nut. This prevents cross threading of the screw rod's threads with those of the nut, when racking out is desired.

The invention also provides a mechanism for allowing the racking out of the circuit breaker with respect to the enclosure. This is accomplished by the mechanical interengagement of the paddles, fins or blocks 531 and 532 with the ears or protrusions 440 of the nut as well as the fingers of the rotative rods and their interaction with the inside walls of the bracket, when the base legs of the square rods are, once again, superimposed or overlying the fingers of the round rods. When a counterclockwise rotation of the screw rod is started (for unracking) the paddles/blocks will come into contact with the protrusions (like a pawl and a gear in a ratchet mechanism) and the nut will be held against further rotational movement. This starts the racking out process and does so without a new threading of the screw rod's threads with the threads of the nut. Then, further rotation of the screw rod allows the circuit breaker to be withdrawn or racked out of the enclosure.

In effect, the combination of mechanical components allows for a first holding of the nut for racking in, a racking in limit comprising a one way free rotation of the nut on the screw threads of the screw rod for limiting racking in, and, when racking out is desired, a blocking of nut rotation. Racking in is limited, when the buttons are depressed and, yet, because the nut has captured the screw rod and they stay meshed, no cross threading is possible even at the commencement of racking out. The paddles prevent rotation of the nut in the racking out direction, such that this counterclockwise direction of screw rod rotation will allow for the unracking of the circuit breaker from the enclosure. And, no cross threading of screw rod to internal threads of nut is allowed, at the initiation of racking out (more dangerous and expensive/troublesome than at racking in). The screw rod is maintained, upon and after racking in, upon reaching the limit, within the threads of the nut.

What I claim is:

1. A circuit breaker racking in and out mechanism for a switchgear having an enclosure and a circuit breaker rackable therein and capable of racking out of said enclosure, wherein said racking in and out mechanism allows for initial racking in, limiting racking in until a desired rearward limiting position within said enclosure is reached by said circuit breaker, and racking out said circuit breaker with respect to said enclosure, said circuit breaker racking in and out mechanism comprising:
   a) a screw rod with external threads, rotatively held by said circuit breaker and extending longitudinally within said enclosure;
   b) a receiver nut with internal screw threads mating with said external threads of said screw rod, said receiver nut being held in a fixed position with respect to said enclosure to allow for a first direction of rotation of said screw rod with said external threads in engagement with said internal threads of said receiver nut to result in racking in, i.e., axial rotation of said screw rod in said first direction of rotation results in longitudinal racking in motion of said circuit breaker with respect to said enclosure;
   c) a rearward-limiting, racking in-mechanism for said axial longitudinal motion of said circuit breaker with respect to said enclosure, comprising mechanical means for releasing said receiver nut to allow it to switch from said fixed position with respect to said enclosure to relative rotation with respect to said enclosure so as to allow said receiver nut to rotate when said screw rod is further rotated in said first direction of rotation so that said screw rod and said receiver nut rotate together and no further longitudinal motion of said circuit breaker with respect to said enclosure continues, even when said screw rod is further rotated in said first direction of rotation, commencing when said circuit breaker reaches a desired rearward limit position within said enclosure; and
   d) said screw rod and said receiver nut being held in threaded engagement for each of the steps of racking in, limiting racking in and initial racking out said circuit breaker with respect to said enclosure wherein said receiver nut is blocked from rotation in said first direction of rotation and a second direction of opposite rotation but released from being blocked from rotation when said desired rearward limit position of said circuit breaker within said enclosure is reached.

2. A circuit breaker racking in and out mechanism as claimed in claim 1 wherein said rearward-limiting racking-in mechanism comprises spring biased, front-of the enclosure-facing depressible buttons and said circuit breaker is supported upon a cross-wise support beam such that said front-of the enclosure-facing depressible buttons will be depressed by said cross-wise support beam of said circuit breaker as said circuit breaker moves reaches the rearward limit position.

3. A circuit breaker racking in and out mechanism as claimed in claim 2 wherein said rearward-limit racking-in mechanism comprises at least one L-shaped square rod with an extended base leg and a rotative round rod having an extended finger thereon, wherein said extended base leg of said L-shaped square rod selectively, mechanically, blocks rotation of said rotative round rod by contact of said extended base leg with said extended finger of said rotative round rod.

4. A circuit breaker racking in and out mechanism as claimed in claim 3 wherein said rotative round rod is provided with at least one paddle and said receiver nut is provided with an outwardly extending protrusion such that rotation of said rotative round rod may become blocked by said paddle of said rotative round rod when the same comes into contact with said at least one outwardly extending protrusion of said receiver nut.

5. A circuit breaker racking in and out mechanism as claimed in claim 3 wherein said receiver nut is free to rotate with rotation of said screw rod when the extended base leg of said L-shaped square rod is removed from blocked rotation of said rotative round rod.

6. A circuit breaker racking in and out mechanism as claimed in claim 5 wherein said L-shaped square rod is removed from blocking rotation of said rotative round rod when said L-shaped square rod is mechanically moved away from said rotative round rod.

7. A circuit breaker racking in and out mechanism as claimed in claim 6 wherein said movement of said L-shaped square rod away from said rotative round rod is a relative rearward pushing of said L-shaped square rod by the rearward relative movement of said cross wise support beam of said circuit breaker into said enclosure.

8. A circuit breaker racking in and out mechanism as claimed in claim 7 wherein said L-shaped square rod can move longitudinally rearwardly with respect to said enclosure by said cross wise support beam bearing against and in contact with said front of the enclosure facing, spring-biased buttons secured to said L-shaped square rods.

9. A circuit breaker racking in and out mechanism as claimed in claim 3 wherein said receiver nut is provided with at least one outwardly extending protrusion which tends to prevent said receiver nut from rotation in said first direction of rotation.

10. A circuit breaker racking in and out mechanism as claimed in claim 3 wherein said L-shaped square rod allows said rotative round rod to rotate when said L-shaped square rod is moved rearwardly with respect to said enclosure.

11. A circuit breaker racking in and out mechanism as claimed in claim 10 wherein said receiver nut is supported by a bracket secured to said enclosure and said extended finger and said leg of said L-shaped square rod block rotation of said rotative round rod by a face of said extended finger of said rotative round rod being sandwiched between said leg of said L-shaped rod and a wall surface of said bracket supporting said receiving nut.

12. A circuit breaker racking in and out mechanism as claimed in claim 4 wherein said receiver nut has a circumferential surface and at least one spring is provided in mechanical connection to said receiver nut and said circuit breaker racking in and out mechanism for biasing said paddles into a temporary blocking position preventing said receiver nut from rotation when said screw rod is rotated in said first direction of rotation and said paddles extend radially downward and towards said circumferential surface of said receiver nut.

13. A circuit breaker racking in and out mechanism as claimed in claim 1 wherein said circuit breaker has a base and said screw rod is rotatively secured to said base and said enclosure has a rear and a bottom with said receiver nut located at said rear and said bottom of said enclosure.

14. A circuit breaker racking in and out mechanism as claimed in claim 1 wherein said enclosure has a front surface and said receiver nut is spring biased forwardly towards said front of said enclosure.

15. A circuit breaker racking in and out mechanism as claimed in claim 14 wherein said receiver nut is provided with outwardly protruding ears and said ears have a spring biasing system which bear against and hold said receiver nut forwardly towards the front of said enclosure.

* * * * *